US012110852B2

(12) United States Patent
Imai et al.

(10) Patent No.: US 12,110,852 B2
(45) Date of Patent: Oct. 8, 2024

(54) FUEL INJECTION VALVE

(71) Applicant: DENSO CORPORATION, Kariya (JP)

(72) Inventors: Keita Imai, Kariya (JP); Atsushi Honda, Nisshin (JP)

(73) Assignee: DENSO CORPORATION, Kariya (JP)

( * ) Notice: Subject to any disclaimer, the term of this patent is extended or adjusted under 35 U.S.C. 154(b) by 265 days.

(21) Appl. No.: 17/870,064

(22) Filed: Jul. 21, 2022

(65) Prior Publication Data

US 2022/0356860 A1 Nov. 10, 2022

Related U.S. Application Data

(63) Continuation of application No. PCT/JP2021/001590, filed on Jan. 19, 2021.

(30) Foreign Application Priority Data

Jan. 23, 2020 (JP) ................................ 2020-009151

(51) Int. Cl.
*F02M 55/00* (2006.01)
*F02M 61/10* (2006.01)

(52) U.S. Cl.
CPC .......... *F02M 55/008* (2013.01); *F02M 61/10* (2013.01)

(58) Field of Classification Search
CPC .. F02M 51/06; F02M 51/061; F02M 51/0617; F02M 51/0625; F02M 51/0664; F02M 51/0671; F02M 51/0682; F02M 51/0685; F02M 55/02; F02M 63/00; F02M 63/0063; F02M 61/10; F02M 61/166; F02M 61/168; F02M 61/1813; F02M 61/1853; F02M 2200/08; F02M 2200/304; F02M 2200/306; F02M 2200/8061
See application file for complete search history.

(56) References Cited

U.S. PATENT DOCUMENTS 5,934,567 A * 8/1999 Fly ...................... F02M 69/047 239/408
6,131,824 A * 10/2000 Fly ...................... F02M 69/047 239/408
6,401,691 B1 6/2002 Kawano et al.
8,186,609 B2 * 5/2012 Rapp ................... F02M 47/027 239/96

(Continued)

FOREIGN PATENT DOCUMENTS

DE 103 46 212 A1 4/2005
DE 102015226515 6/2017

(Continued)

*Primary Examiner* — Logan M Kraft
*Assistant Examiner* — Johnny H Hoang
(74) *Attorney, Agent, or Firm* — Nixon & Vanderhye P.C.

(57) ABSTRACT

A fuel injection valve includes a nozzle, a housing, a needle, and a throttle portion. The nozzle includes an injection hole through which fuel is injected and a valve seat formed around the injection hole. The nozzle includes an injection hole through which fuel is injected and a valve seat formed around the injection hole. The housing has a fuel flow path through which the fuel to the injection hole flows. One end of the needle is configured to open and close the injection hole by being separated from the valve seat or abutted on the valve seat. The throttle portion is provided upstream with respect to the valve seat in a fuel flow direction.

4 Claims, 20 Drawing Sheets

(56) References Cited

U.S. PATENT DOCUMENTS

| | | | | |
|---|---|---|---|---|
| 2011/0219743 | A1* | 9/2011 | Johnson | F02K 9/58 239/533.2 |
| 2014/0001290 | A1* | 1/2014 | Nishida | F02M 51/0685 239/585.1 |
| 2018/0080420 | A1 | 3/2018 | Yamamoto | |
| 2019/0331076 | A1* | 10/2019 | Saizen | F02M 51/0685 |
| 2019/0368452 | A1 | 12/2019 | Yamamoto | |

FOREIGN PATENT DOCUMENTS

| | | |
|---|---|---|
| JP | 2765185 | 4/1998 |
| JP | 2004-137990 | 5/2004 |
| JP | 4127216 | 7/2008 |
| JP | 2009-191773 | 8/2009 |

* cited by examiner

FUEL INJECTION VALVE

CROSS REFERENCE TO RELATED APPLICATIONS

The present application is a continuation application of International Patent Application No. PCT/JP2021/001590 filed on Jan. 19, 2021, which designated the U.S. and claims the benefit of priority from Japanese Patent Application No. 2020-009151 filed on Jan. 23, 2020. The entire disclosures of all of the above applications are incorporated herein by reference.

TECHNICAL FIELD

The present disclosure relates to a fuel injection valve.

BACKGROUND

A fuel injection valve that reduces pressure pulsation generated in a fuel flow path through which fuel flows is known. For example, in an exemplary fuel injection valve, an orifice member in which an orifice as a throttle flow path is formed is provided in a fuel flow path. Thus, pressure pulsation generated in a valve closing time, in which a needle is abutted on a valve seat, passes through the orifice and is reduced.

SUMMARY

The present disclosure provides a fuel injection valve. The fuel injection valve includes a nozzle, a housing, a needle, and a throttle portion. The nozzle includes an injection hole through which fuel is injected and a valve seat formed around the injection hole. The nozzle includes an injection hole through which fuel is injected and a valve seat formed around the injection hole. The housing has a fuel flow path through which the fuel to the injection hole flows. One end of the needle is configured to open and close the injection hole by being separated from the valve seat or abutted on the valve seat. The throttle portion is provided upstream with respect to the valve seat in a fuel flow direction.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
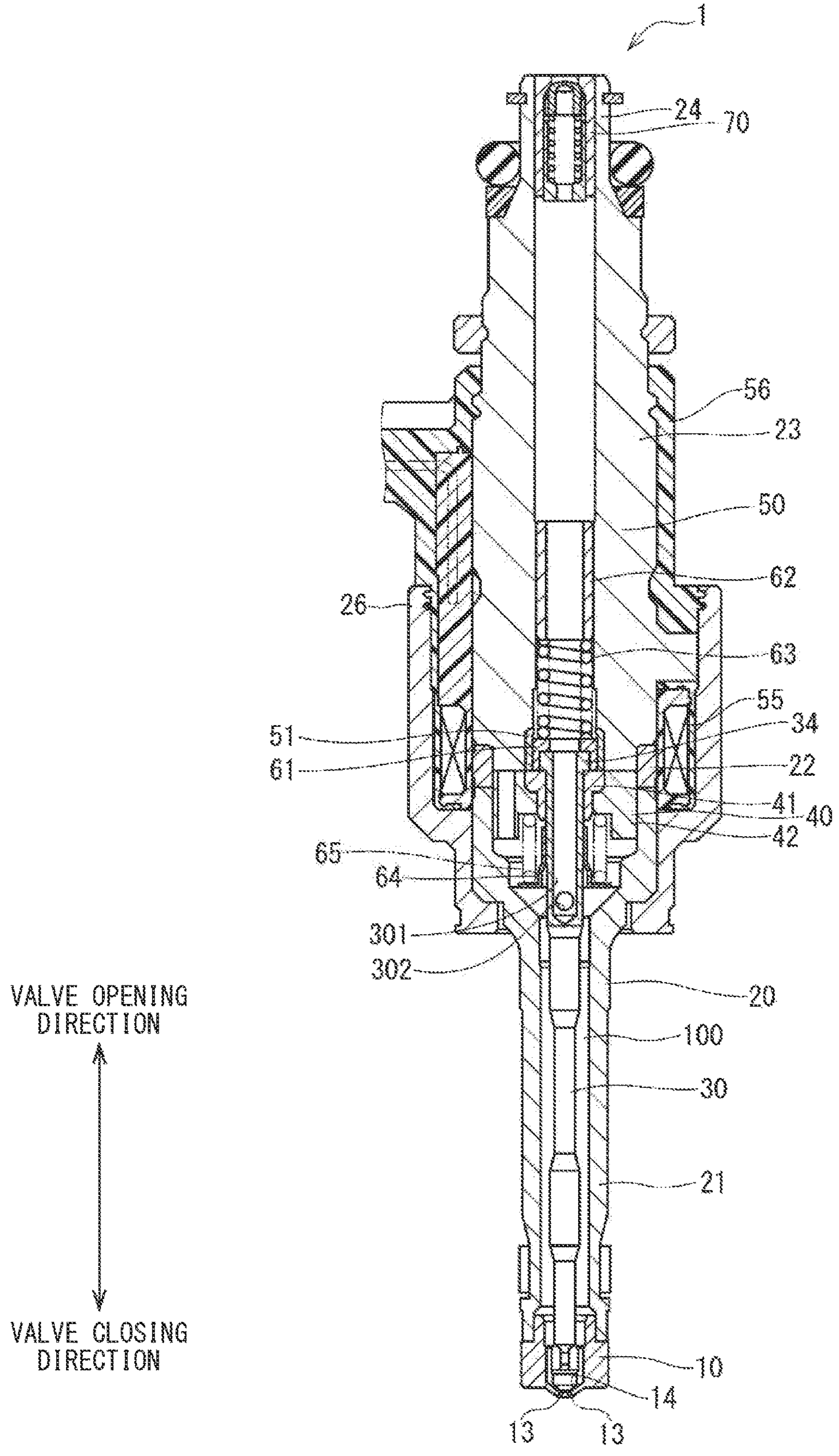
FIG. 1 is a cross-sectional view illustrating a fuel injection valve according to a first embodiment.

For example, in an exemplary fuel injection valve, which has an orifice member, in a valve opening time in which the needle separates from the valve seat, fuel is throttled by the orifice and flows toward an injection hole side. Thus, the pressure of the fuel during the valve opening time may decrease, and the injection amount of the fuel may decrease.

The present disclosure provides a fuel injection valve capable of reducing pressure pulsation after closing a valve while suppressing a decrease in pressure of fuel in a valve opening time.

An exemplary embodiment of the present disclosure provides a fuel injection valve that includes a nozzle, a housing, a needle, and a throttle portion. The nozzle includes an injection hole through which fuel is injected and a valve seat formed around the injection hole. The nozzle includes an injection hole through which fuel is injected and a valve seat formed around the injection hole. The housing has a fuel flow path through which the fuel to the injection hole flows. One end of the needle is configured to open and close the injection hole by being separated from the valve seat or abutted on the valve seat. The throttle portion is provided upstream with respect to the valve seat in a fuel flow direction. The throttle portion includes a movable part at least a part of which is relatively movable with respect to the housing, and a throttle flow path that is formed so as to allow the fuel to flow through and has a minimum flow path area that changes when the movable part moves relative to the housing.

The minimum flow path area of the throttle flow path during a valve opening time in which the needle is separated from the valve seat is larger than the minimum flow path area of the throttle flow path during a valve closing time in which the needle is abutted on the valve seat. The minimum flow path area of the throttle flow path during the valve opening time is larger than a minimum flow path area between the valve seat and the needle during the valve opening time in which the needle is most separated from the valve seat. A maximum value of the minimum flow path area of the throttle flow path during the valve opening time is regulated to be constant. The needle is provided separately from the throttle portion so as to be relatively movable with respect to the throttle portion, and is provided between the valve seat and the throttle portion.

In the exemplary embodiment of the present disclosure, during the valve opening time in which the needle separates from the valve seat, the fuel passes through the throttle flow path and flows toward the injection hole side. Here, the minimum flow path area of the throttle flow path during the valve opening time in which the needle separates from the valve seat is larger than the minimum flow path area of the throttle flow path during the valve closing time in which the needle is abutted on the valve seat. The minimum flow path area of the throttle flow path during the valve opening time is larger than the minimum flow path area between the valve seat and the needle during the valve opening time when the needle is most separated from the valve seat. Therefore, the fuel on a side opposite to the injection hole with respect to the throttle flow path flows toward the injection hole side without being throttled by the throttle flow path. Thus, it is possible to suppress a decrease in the pressure of the fuel during the valve opening time and to secure the injection amount of the fuel.

On the other hand, pressure pulsation generated during the valve closing time in which the needle is abutted on the valve seat is transmitted through the fuel flow path from the valve seat side to the throttle portion side, and passes through the throttle flow path. Here, the minimum flow path area of the throttle flow path during the valve opening time is larger than the minimum flow path area of the throttle flow path during the valve closing time. That is, the minimum flow path area of the throttle flow path during the valve closing time is smaller than the minimum flow path area of the throttle flow path during the valve opening time. Therefore, the pressure pulsation generated during the valve closing time attenuates when passing through the throttle flow path. Thus, the pressure pulsation after valve closing can be reduced.

Hereinafter, a fuel injection valve according to a plurality of embodiments will be described with reference to the drawings. In the plurality of embodiments, substantially the same components are denoted by the same reference numerals, and the description thereof will be omitted.

First Embodiment

FIG. 1 illustrates a fuel injection valve according to a first embodiment. The fuel injection valve 1 is applied to, for example, a gasoline engine (hereinafter, simply referred to as an "engine") as an internal combustion engine mounted on a vehicle, which is not illustrated. The fuel injection valve 1 injects gasoline as fuel to supply the gasoline to the engine.

The fuel injection valve 1 includes a nozzle 10, a housing 20, a needle 30, a movable core 40, a coil 55, a gap forming member 61, a spring 63, a spring 65, a throttle portion 70, and the like.

The nozzle 10 is formed in a bottomed cylindrical shape by, for example, metal. The nozzle 10 has an injection hole 13 and a valve seat 14. A plurality of injection holes 13 is formed so as to penetrate a bottom portion of the nozzle 10 from the inside to the outside. The valve seat 14 is annularly formed around the injection hole 13 inside the bottom portion of the nozzle 10.

The housing 20 includes a first cylindrical member 21, a second cylindrical member 22, and a third cylindrical member 23. Each of the first cylindrical member 21, the second cylindrical member 22, and the third cylindrical member 23 is formed in a substantially cylindrical shape. The first cylindrical member 21, the second cylindrical member 22, and the third cylindrical member 23 are coaxially disposed in the order of the first cylindrical member 21, the second cylindrical member 22, and the third cylindrical member 23, and are connected to each other.

The first cylindrical member 21 and the third cylindrical member 23 are formed by a magnetic material, for example. The second cylindrical member 22 is formed by a non-magnetic material, for example. The second cylindrical member 22 functions as a magnetic throttle portion.

The first cylindrical member 21 is provided so that an inner wall of an end portion on a side opposite to the second cylindrical member 22 is fitted to an outer wall of a cylindrical portion of the nozzle 10.

A fuel flow path 100 is formed inside the housing 20. The fuel flow path 100 is connected to the injection hole 13. A pipe that is not illustrated is connected to the third cylindrical member 23 on a side opposite to the second cylindrical member 22. Thus, fuel from a fuel supply source (fuel pump) flows into the fuel flow path 100 via the pipe. The fuel flow path 100 guides the fuel to the injection hole 13.

The needle 30 is formed in a rod shape by, for example, a non-magnetic metal. The needle 30 is accommodated in the housing 20 so as to be capable of reciprocation in an axial direction of the housing 20 in the fuel flow path 100. A flange portion 34 is formed on the needle 30. The flange portion 34 is formed in a substantially cylindrical shape so as to extend radially outward from an end portion of the needle 30 on a side opposite to the nozzle 10.

An axial flow path 301 and a radial flow path 302 are formed in the needle 30. The axial flow path 301 is formed to extend in the axial direction from an end surface of the needle 30 on the side opposite to the nozzle 10. The radial flow path 302 is formed to extend in a radial direction of the needle 30 and connect the axial flow path 301 and an outer wall of the needle 30. Thus, the fuel on the side opposite to the nozzle 10 with respect to the needle 30 can flow between the outer wall of the needle 30 and the inner wall of the first cylindrical member 21 via the axial flow path 301 and the radial flow path 302.

An end portion of the needle 30 on a side of the nozzle 10 separates (unseats) from the valve seat 14 or abutted (seated) on the valve seat 14 to open and close the injection hole 13. Hereinafter, a direction in which the needle 30 separates from the valve seat 14 will be referred to as a valve opening direction, and a direction in which the needle 30 is abutted on the valve seat 14 will be referred to as a valve closing direction as appropriate.

The movable core 40 includes an inner core 41 and an outer core 42. The inner core 41 is formed in a cylindrical shape by, for example, a non-magnetic material. The outer core 42 is formed in a cylindrical shape by, for example, a magnetic material. The inner core 41 is provided on a radially outer side of the needle 30 so as to be relatively movable in the axial direction with respect to the needle 30 on the nozzle 10 side with respect to the flange portion 34. The flange portion 34 restricts relative movement of the inner core 41 in the valve opening direction with respect to the needle 30. The outer core 42 is provided on a radially outer side of the needle 30 and the inner core 41 so as to be relatively movable in the axial direction with respect to the needle 30 and the inner core 41 on the nozzle 10 side with respect to the flange portion 34. The inner core 41 restricts relative movement of the outer core 42 in the valve opening direction with respect to the needle 30 and the inner core 41.

The third cylindrical member 23 includes a fixed core portion 50 and an inlet portion 24. The fixed core portion 50 is formed on the second cylindrical member 22 side of the third cylindrical member 23. The inlet portion 24 is formed to be connected to the fixed core portion 50 on the side of the third cylindrical member 23 opposite to the second cylindrical member 22. An end surface of the fixed core portion 50 on the nozzle 10 side can be abutted on an end surface of the outer core 42 on a side opposite to the nozzle 10.

The gap forming member 61 is formed in a bottomed cylindrical shape by, for example, a non-magnetic metal. The gap forming member 61 is provided so that an inner peripheral wall of a cylindrical portion is slidable with an outer peripheral wall of the flange portion 34 and a bottom portion can be abutted on the flange portion 34. When the bottom portion of the gap forming member 61 is abutted on the flange portion 34 and the cylindrical portion of the gap forming member 61 is abutted on an end surface of the inner core 41 on the side opposite to the nozzle 10, a gap is formed between an end surface of the flange portion 34 on the nozzle 10 side and the end surface of the inner core 41 on the side opposite to the nozzle 10. A hole penetrating the bottom portion is formed in the gap forming member 61. Here, an inner diameter of the hole is larger than an inner diameter of the axial flow path 301.

A sleeve 51 is provided inside an end portion of the fixed core portion 50 on the nozzle 10 side. The sleeve 51 is formed in a cylindrical shape by, for example, a non-magnetic metal. Here, an inner peripheral wall of the sleeve 51 is slidable with the outer peripheral wall of the flange portion 34. An end surface of the sleeve 51 on the nozzle 10 side can be abutted on the end surface of the inner core 41 on the side opposite to the nozzle 10.

A cylindrical adjusting pipe 62 is press-fitted inside the fixed core portion 50. The spring 63 is, for example, a coil spring, and is provided between the adjusting pipe 62 inside the fixed core portion 50 and the gap forming member 61. One end of the spring 63 is abutted on the adjusting pipe 62. The other end of the spring 63 is abutted on the bottom portion of the gap forming member 61. The spring 63 can bias the gap forming member 61, the needle 30, and the movable core 40 toward the nozzle 10 side, that is, in the valve closing direction. A biasing force of the spring 63 is adjusted by the position of the adjusting pipe 62 with respect to the fixed core portion 50.

The coil 55 is formed in a substantially cylindrical shape and is provided so as to surround a radially outer side of the second cylindrical member 22 and the third cylindrical member 23 in the housing 20. A cylindrical holder 26 is provided on a radially outer side of the coil 55 so as to cover the coil 55. The holder 26 is formed by, for example, a magnetic material. In the holder 26, an inner wall at one end is connected to an outer wall of the first cylindrical member 21, and an inner wall at the other end is magnetically connected to an outer wall of the third cylindrical member 23.

The coil 55 generates a magnetic force when power is supplied (energized). When the magnetic force is generated in the coil 55, a magnetic circuit is formed in the outer core 42, the first cylindrical member 21, the holder 26, and the fixed core portion 50 of the third cylindrical member 23 while avoiding the second cylindrical member 22 as the magnetic throttle portion. Thus, a magnetic attraction force is generated between the fixed core portion 50 and the outer core 42, and the outer core 42 is attracted toward the fixed core portion 50 side together with the inner core 41. At this time, the inner core 41 moves in the valve opening direction while accelerating in the gap between the flange portion 34 and the inner core 41, and collides with the flange portion 34. Thus, the needle 30 moves in the valve opening direction, the end portion of the needle 30 separates from the valve seat 14 to open the valve. Consequently, the injection hole 13 is opened, and the fuel is injected from the injection hole 13. As described above, when the coil 55 is energized, the outer core 42 can be attracted toward the fixed core portion 50 side, and the needle 30 can be moved to a side opposite to the valve seat 14, that is, in the valve opening direction.

When the outer core 42 is attracted toward the fixed core portion 50 side (valve opening direction) by the magnetic attraction force, the flange portion 34 of the needle 30 moves in the axial direction inside the sleeve 51. At this time, the outer peripheral wall of the flange portion 34 and the inner peripheral wall of the cylindrical portion of the gap forming member 61 slide, and the outer peripheral wall of the cylindrical portion of the gap forming member 61 and the inner peripheral wall of the sleeve 51 slide. Therefore, reciprocating movement in the axial direction of the end portion of the needle 30 on the flange portion 34 side is guided by the sleeve 51.

When the outer core 42 is attracted toward the fixed core portion 50 side (valve opening direction) by the magnetic attraction force, the end surface on the fixed core portion 50 side collides with the end surface on the nozzle 10 side of the fixed core portion 50. Thus, the movement of the outer core 42 in the valve opening direction is restricted.

When the energization to the coil 55 is stopped in a state where the outer core 42 is attracted toward the fixed core portion 50 side, the needle 30 and the movable core 40 are biased toward the valve seat 14 side by the biasing force of the spring 63. Thus, the needle 30 moves in the valve closing direction, and the end portion of the needle 30 is abutted on the valve seat 14 to close the valve. Consequently, the injection hole 13 is closed.

A spring seat 64 is fixed to the needle 30. The spring seat 64 is fixed to an outer peripheral wall of the needle 30 so as to be located on the radially outer side of the needle 30 on the nozzle 10 side with respect to the movable core 40.

The spring 65 is, for example, a coil spring, and is provided in a state where one end is abutted on a surface of the outer core 42 on the nozzle 10 side and the other end is abutted on the spring seat 64. The spring 65 can bias the outer core 42 toward the fixed core portion 50 side, that is, in the valve opening direction. A biasing force of the spring 65 is smaller than the biasing force of the spring 63. Therefore, when the coil 55 is not energized, the needle 30 is pressed against the valve seat 14 by the spring 63, and the inner core 41 is pressed against the cylindrical portion of the gap forming member 61. At this time, a gap is formed between the end surface of the flange portion 34 on the nozzle 10 side and the end surface of the inner core 41 on the side opposite to the nozzle 10.

As illustrated in FIG. 1, the radially outer side of the third cylindrical member 23 is molded by a mold portion 56 formed by resin.

The fuel flowing from an end portion of the third cylindrical member 23 on a side opposite to the second cylindrical member 22, that is, the inlet portion 24 flows through the inside of the third cylindrical member 23 and the adjusting pipe 62, the hole of the gap forming member 61, the axial flow path 301, the radial flow path 302, between the needle 30 and the inner wall of the housing 20, and between the needle 30 and the inner wall of the nozzle 10, that is, the fuel flow path 100, and is guided to the injection hole 13.

The minimum value of pressure of the fuel in the fuel flow path 100 assumed at the time of using the fuel injection valve 1 of the present embodiment is, for example, 60 MPa or less.

Figure 2:
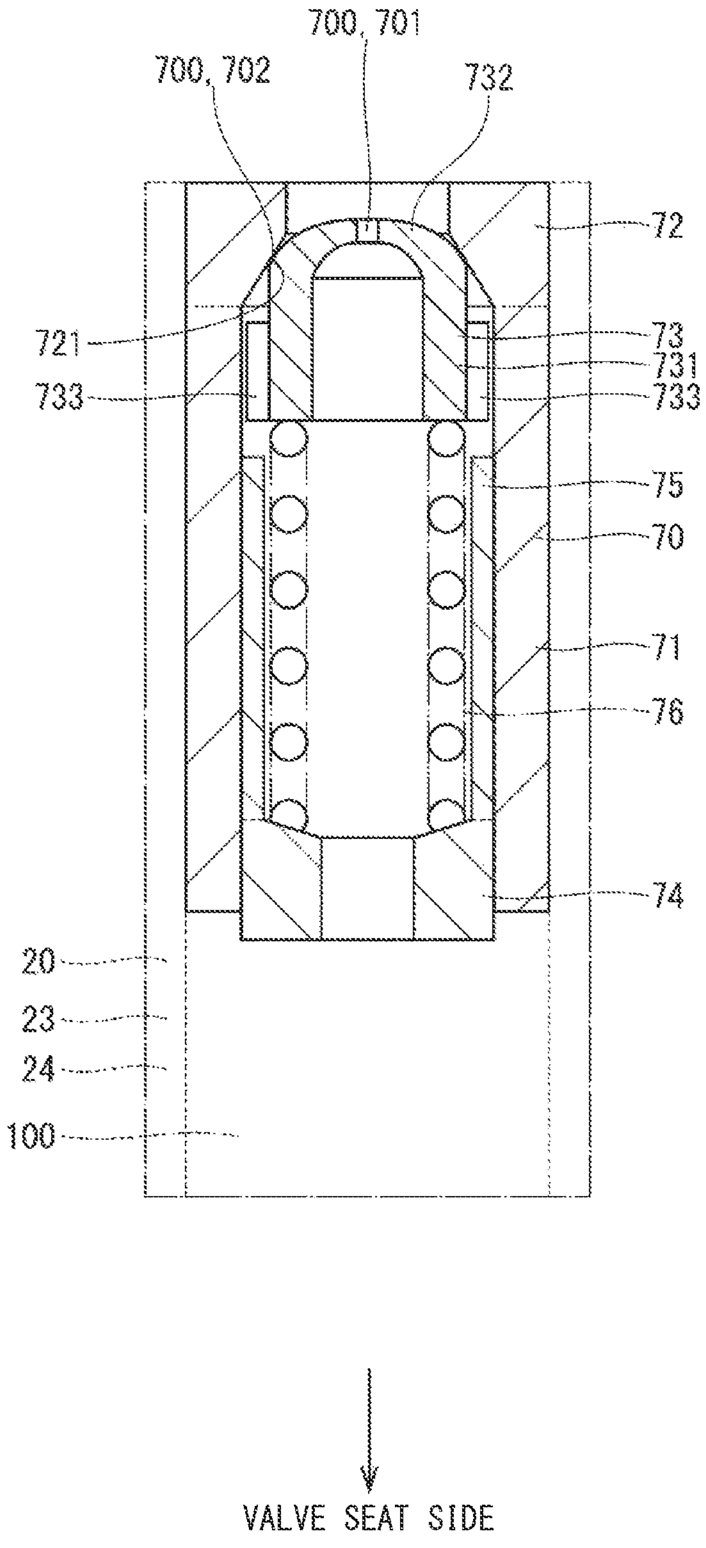
FIG. 2 is a cross-sectional view illustrating a throttle portion of the fuel injection valve according to the first embodiment.

Next, the throttle portion 70 will be described in detail. The throttle portion 70 is provided inside the inlet portion 24. As illustrated in FIG. 2, the throttle portion 70 includes a throttle cylindrical portion 71, a seat portion 72, a movable part 73, a spring seat portion 74, a restriction portion 75, a spring 76, a throttle flow path 701, a throttle flow path 702, and the like.

The throttle cylindrical portion 71 is formed in a substantially cylindrical shape by, for example, metal. The seat portion 72 is formed in a cylindrical shape by, for example, metal. The seat portion 72 is formed integrally with the throttle cylindrical portion 71 so as to be connected to an end portion of the throttle cylindrical portion 71. A seat 721 is formed on an inner peripheral wall of the seat portion 72 on the throttle cylindrical portion 71 side. The seat 721 is formed in a tapered shape so as to approach an axis of the seat portion 72 from the throttle cylindrical portion 71 side toward a side opposite to the throttle cylindrical portion 71.

The movable part 73 is formed by, for example, metal. The movable part 73 includes a movable cylindrical portion 731, a movable bottom portion 732, and a guide portion 733. The movable cylindrical portion 731 is formed in a substantially cylindrical shape. Here, the outer diameter of the movable cylindrical portion 731 is smaller than an inner diameter of the throttle cylindrical portion 71. The movable bottom portion 732 is formed integrally with the movable cylindrical portion 731 so as to close an end portion of the movable cylindrical portion 731. An inner wall and an outer wall of the movable bottom portion 732 are formed in a curved surface shape projecting to the side opposite to the movable cylindrical portion 731. More specifically, an outer wall of the movable bottom portion 732 is formed in an SR shape.

The guide portion 733 protrudes radially outward from an outer peripheral wall of the movable cylindrical portion 731 and extends in the axial direction of the movable cylindrical portion 731. Four guide portions 733 are formed at equal intervals in a circumferential direction of the movable cylindrical portion 731.

The movable part 73 is provided inside the throttle cylindrical portion 71 and the seat portion 72 so that an outer edge portion of the outer wall of the movable bottom portion 732 can be abutted on the seat 721. The movable part 73 can reciprocate in the axial direction inside the throttle cylindrical portion 71 and the seat portion 72. The guide portion 733 is slidable with an inner peripheral wall of the throttle cylindrical portion 71.

The spring seat portion 74 is formed in a substantially cylindrical shape by, for example, metal. An outer diameter of the spring seat portion 74 is the same as or larger than the inner diameter of the throttle cylindrical portion 71. The restriction portion 75 is formed in a substantially cylindrical shape by, for example, metal. The restriction portion 75 is formed integrally with the spring seat portion 74 so as to extend in the axial direction from an outer edge portion of one end surface of the spring seat portion 74. An inner diameter of the restriction portion 75 is larger than an inner diameter of the spring seat portion 74. An outer diameter of the restriction portion 75 is the same as the outer diameter of the spring seat portion 74.

The spring seat portion 74 and the restriction portion 75 are press-fitted into the throttle cylindrical portion 71 so that an outer peripheral wall is fitted to the inner peripheral wall of the throttle cylindrical portion 71. The spring seat portion 74 and the restriction portion 75 are provided so as to be relatively immovable with respect to the throttle cylindrical portion 71.

In the movable part 73, the guide portion 733 can abut on an end portion of the restriction portion 75 on a side opposite to the spring seat portion 74. Thus, the movable part 73 can reciprocate in the axial direction between the seat 721 and the restriction portion 75. When the movable bottom portion 732 is abutted on the seat 721, movement of the movable part 73 in the axial direction toward the seat portion 72 side is restricted. On the other hand, when the guide portion 733 is abutted on the restriction portion 75, movement of the movable part 73 in the axial direction toward the restriction portion 75 side is restricted. That is, the restriction portion 75 restricts the movement of the movable part 73 in the axial direction toward the restriction portion 75 side.

The spring 76 is, for example, a coil spring, and is provided between the spring seat portion 74 and the movable part 73 inside the restriction portion 75. One end of the spring 76 is abutted on a surface of the spring seat portion 74 on the restriction portion 75 side. The other end of the spring 76 is abutted an end surface of the movable cylindrical portion 731 of the movable part 73 on the side opposite to the movable bottom portion 732. The spring 76 can bias the movable part 73 toward the seat 721 side. Thus, the outer wall of the movable bottom portion 732 is pressed against the seat 721. A biasing force of the spring 76 is adjusted by the position of the spring seat portion 74 with respect to the throttle cylindrical portion 71.

The throttle portion 70 is provided inside the inlet portion 24 so that outer peripheral walls of the throttle cylindrical portion 71 and the seat portion 72 are fitted to an inner peripheral wall of the inlet portion 24. Here, the throttle cylindrical portion 71 and the seat portion 72 are press-fitted into the inlet portion 24.

The throttle flow path 701 is formed so as to penetrate the center of the movable bottom portion 732 in a plate thickness direction. Thus, the fuel can flow through the throttle flow path 701.

The throttle flow path 702 is annularly formed between the movable bottom portion 732 of the movable part 73 and the seat 721. When the movable bottom portion 732 of the movable part 73 is separated from the seat 721, the fuel can flow through the throttle flow path 702. A minimum flow path area of the throttle flow path 702 is zero when the movable part 73 is abutted on the seat 721 (see (B) of FIG. 3). Thus, at this time, the fuel cannot flow through the throttle flow path 702. On the other hand, the minimum flow path area of the throttle flow path 702 is maximized when the movable part 73 separates from the seat 721 and the guide portion 733 is abutted on the restriction portion 75 (see (A) of FIG. 3). Here, the throttle flow path 701 and the throttle flow path 702 are collectively referred to as a throttle flow path 700.

Next, operations of the fuel injection valve 1 and the throttle portion 70 will be described. An electronic control unit (hereinafter, referred to as "ECU") not illustrated is connected to the coil 55. The ECU is a small computer including a CPU as an arithmetic unit, a ROM and a RAM as a storage unit, an I/O as an input/output unit, and the like. The ECU controls operations of an engine, a device, an apparatus, and the like mounted on the vehicle based on information and the like from various sensors provided in each part of the vehicle, and controls traveling and the like of the vehicle.

The ECU controls energization of the coil 55 to control operations of the fuel injection valve 1 and the engine, and control the vehicle. When the coil 55 is energized by the ECU, a magnetic attraction force is generated between the fixed core portion 50 and the outer core 42, and the movable core 40 and the gap forming member 61 move in the valve opening direction against the biasing force of the spring 63. When the inner core 41 collides with the flange portion 34, the needle 30 moves in the valve opening direction, and separates from the valve seat 14 to open the valve. Thus, the fuel in the fuel flow path 100 is injected into the combustion chamber of the engine outside the fuel injection valve 1 via the injection hole 13.

When the needle 30 separates from the valve seat 14 to open the valve, the pressure of the fuel on the valve seat 14 side with respect to the movable part 73 of the throttle portion 70 in the fuel flow path 100 becomes lower than the pressure of the fuel on the side opposite to the valve seat 14 with respect to the movable part 73. Thus, a differential pressure is generated between the valve seat 14 side and the side opposite to the valve seat 14 with respect to the movable part 73. Therefore, the movable part 73 separates from the seat 721 and moves toward the valve seat 14 side against the biasing force of the spring 76 (see (A) of FIG. 3).

Thus, the minimum flow path area of the throttle flow path 702 between the movable part 73 and the seat 721 increases, and the fuel on the side opposite to the valve seat 14 with respect to the movable part 73 flows toward the valve seat 14 side via the throttle flow path 701 and the throttle flow path 702.

Here, the movement of the movable part 73 toward the valve seat 14 side is restricted by the guide portion 733 abutting on the restriction portion 75. Thus, the maximum value of the minimum flow path area of the throttle flow path 700 (throttle flow path 701 and throttle flow path 702) during the valve opening time is regulated to be constant. At this time, the maximum value of the minimum flow path area of the throttle flow path 700 (throttle flow path 701 and throttle flow path 702) is relatively large. Therefore, the fuel is prevented from being throttled by the throttle flow path 700, and the flow rate of the fuel flowing from the pipe side to the valve seat 14 side can be sufficiently secured.

When the energization of the coil 55 is stopped by the ECU, the magnetic attraction force between the fixed core portion 50 and the outer core 42 disappears, and the outer core 42 separates from the fixed core portion 50 by the biasing force of the spring 63 and moves toward the valve seat 14 side. Thus, the flange portion 34 is pushed toward the valve seat 14 side by the bottom portion of the gap forming member 61, and the needle 30 moves toward the valve seat 14 side. When the needle 30 is abutted on the valve seat 14 to close the valve, a pressure wave is generated in the vicinity of the valve seat 14 of the fuel flow path 100. The pressure wave generated in the vicinity of the valve seat 14 propagates through the fuel flow path 100 toward the throttle portion 70 side.

When the needle 30 is abutted on the valve seat 14 to close the valve, the pressure of the fuel on the valve seat 14 side with respect to the movable part 73 of the throttle portion 70 in the fuel flow path 100 becomes equal to the pressure of the fuel on the side opposite to the valve seat 14 with respect to the movable part 73. Therefore, the movable part 73 moves to the side opposite to the valve seat 14 by the biasing force of the spring 76 and is abutted on the seat 721 (see (B) of FIG. 3).

Thus, the minimum flow path area of the throttle flow path 702 between the movable part 73 and the seat 721 becomes zero. Therefore, the pressure wave generated in the vicinity of the valve seat 14 during the valve closing time passes only through the throttle flow path 701 and propagates to the pipe side. The pressure wave attenuates when passing through the throttle flow path 701.

Here, the minimum flow path area of the throttle flow path 700 (throttle flow path 701 and throttle flow path 702) during the valve closing time is smaller than the minimum flow path area of the throttle flow path 700 (throttle flow path 701 and throttle flow path 702) during the valve opening time.

Figure 4:
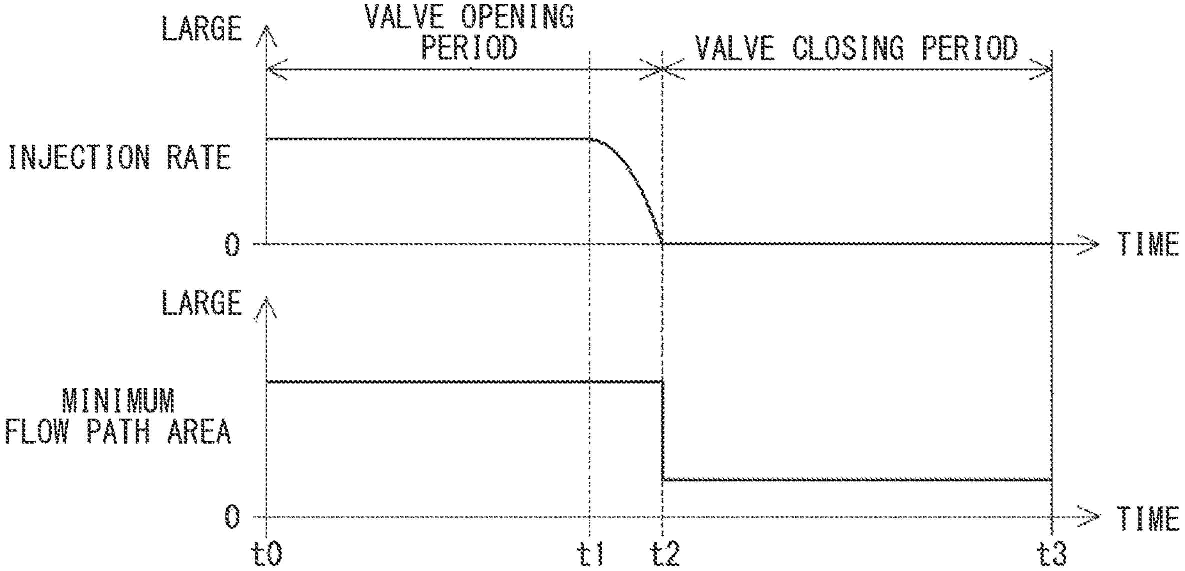
FIG. 4 is a diagram illustrating changes in a minimum flow path area of a throttle flow path and an injection rate of fuel from the fuel injection valve when shifting from a valve open state to a valve closed state.

FIG. 4 illustrates changes in the minimum flow path area of the throttle flow path 700 and an injection rate of the fuel from the fuel injection valve 1 when shifting from the valve open state of the needle 30 to the valve closed state.

Figure 3:
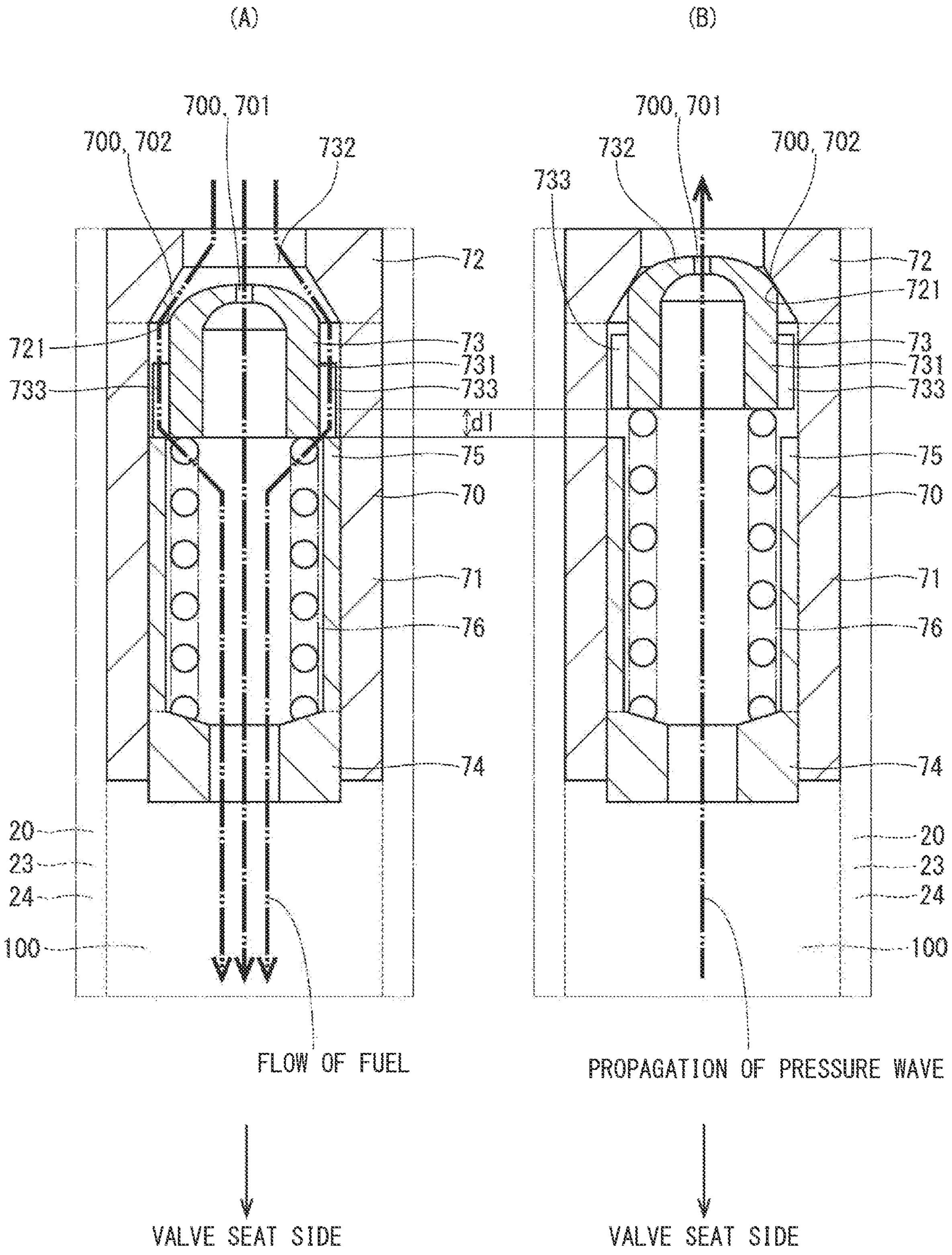
FIG. 3 is a view for explaining an operation of the throttle portion of the fuel injection valve according to the first embodiment.

At time t0, the movable part 73 separates from the seat 721, and the guide portion 733 is abutted on the restriction portion 75 (see (A) of FIG. 3). From time t0 to time t1, the minimum flow path area of the throttle flow path 700 (throttle flow path 701 and throttle flow path 702) is relatively large and constant. Therefore, the fuel injection rate at this time is also relatively large and constant.

When the energization of the coil 55 is stopped at time t1, the needle 30 moves toward the valve seat 14 side after time t1, and the needle 30 is abutted on the valve seat 14 at time t2 to close the valve. The fuel injection rate decreases after time t1 and becomes zero at time t2.

When the needle 30 is abutted on the valve seat 14 to close the valve at time t2, the pressure of the fuel on the valve seat 14 side with respect to the movable part 73 of the throttle portion 70 in the fuel flow path 100 becomes equal to the pressure of the fuel on the side opposite to the valve seat 14 with respect to the movable part 73. Thus, the movable part 73 is abutted on the seat 721, and the minimum flow path area of the throttle flow path 700 (throttle flow path 701 and throttle flow path 702) decreases to the minimum flow path area of the throttle flow path 701.

After time t2, the fuel injection rate is zero, and the minimum flow path area of the throttle flow path 700

(throttle flow path 701 and throttle flow path 702) is the minimum flow path area of the throttle flow path 701 and is constant.

When the needle 30 closes the valve a plurality of times within a predetermined period, a pressure wave accompanying the valve closing is generated a plurality of times in the vicinity of the valve seat 14 of the fuel flow path 100. Thus, in the fuel flow path 100, pressure pulsation accompanying the plurality of times of valve closing occurs.

In the present embodiment, as described above, the pressure wave that has passed through the throttle flow path 701 can be attenuated. Therefore, the pressure pulsation generated in the fuel flow path 100 can be reduced by the throttle portion 70.

Incidentally, in the present embodiment, for the main purpose of reducing wet in the combustion chamber of the engine and reducing PN, the ECU can control the fuel injection valve 1 so as to inject the fuel a plurality of times in one combustion cycle of the engine, that is, to perform what is called multi-stage injection. Therefore, in the vicinity of the valve seat 14 of the fuel flow path 100, a pressure wave accompanying the valve closing is generated a plurality of times in a short time. Thus, pressure pulsation occurs in the fuel flow path 100 in a short time.

In the present embodiment, as described above, the pressure wave that has passed through the throttle flow path 701 can be attenuated. Therefore, the pressure pulsation generated in the fuel flow path 100 during the multi-stage injection can be reduced by the throttle portion 70.

In the case of a fuel injection valve in which the pressure pulsation generated in the fuel flow path 100 during the multi-stage injection is not reduced, the injection amount after the first injection may be affected by the pressure pulsation and fluctuate.

Hereinafter, the configuration of the present embodiment will be further described.

The throttle portion 70 is provided on the upstream side of the fuel flow with respect to the valve seat 14. The throttle portion 70 includes the movable part 73 and the throttle flow path 700 (throttle flow path 701 and throttle flow path 702). The movable part 73 is relatively movable with respect to the housing 20. The throttle flow path 700 is formed so that the fuel can flow, and the minimum flow path area changes when the movable part 73 moves relative to the housing 20.

The minimum flow path area of the throttle flow path 700 during the valve opening time in which the needle 30 separates from the valve seat 14 is larger than the minimum flow path area of the throttle flow path 700 during the valve closing time in which the needle 30 is abutted on the valve seat 14. The minimum flow path area of the throttle flow path 700 during the valve opening time is larger than the minimum flow path area between the valve seat 14 and the needle 30 during the valve opening time in which the needle 30 is most separated from the valve seat 14. The maximum value of the minimum flow path area of the throttle flow path 700 during the valve opening time is regulated to be constant. The needle 30 is formed separately from the throttle portion 70 so as to be relatively movable with respect to the throttle portion 70, and is provided between the valve seat 14 and the throttle portion 70.

The minimum flow path area of the throttle flow path 700 increases or decreases as the movable part 73 moves relative to the housing 20 due to the differential pressure by valve opening and closing by the needle 30.

The maximum value (dl illustrated in FIG. 3) of the distance by which the movable part 73 is relatively movable with respect to the housing 20 is smaller than a maximum value of a movable distance of the needle 30 from the valve seat 14.

The minimum flow path area of the throttle flow path 700 during the valve closing time is smaller than the minimum flow path area between the valve seat 14 and the needle 30 during the valve opening time in which the needle 30 is most separated from the valve seat 14, that is, during full lift of the needle 30.

Figure 5:
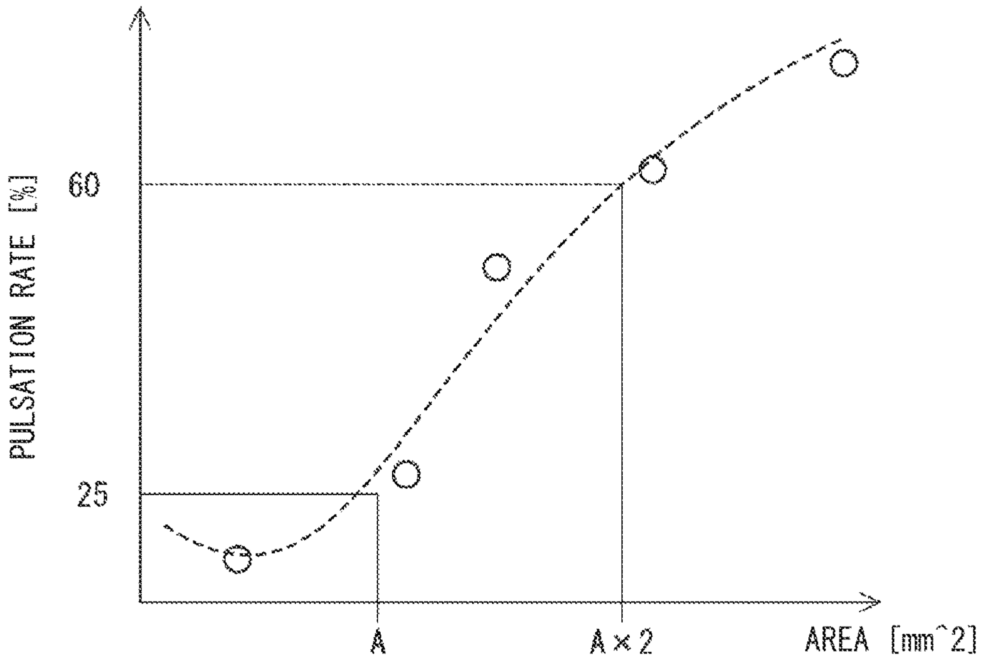
FIG. 5 is a diagram illustrating a relationship between the minimum flow path area of the throttle flow path during a valve closing time and a pulsation rate of pressure pulsation generated in a fuel flow path accompanying valve closing.

Here, FIG. 5 illustrates the relationship between the minimum flow path area ($mm^2$) of the throttle flow path 700 (throttle flow path 701) during the valve closing time of the needle 30 and a pulsation rate (%) of the pressure pulsation generated in the fuel flow path 100 accompanying valve closing. Here, the pulsation rate (%) is a value obtained by multiplying a ratio of a pressure fluctuation of the fuel flow path 100 in a case where the throttle portion 70 is provided in the fuel flow path 100 and a pressure fluctuation of the fuel flow path 100 in a case where the throttle portion 70 is not provided in the fuel flow path 100 by 100.

As illustrated in FIG. 5, it can be seen that the pulsation rate can be reduced when the minimum flow path area of the throttle flow path 700 during the valve closing time is smaller than a predetermined value A ($mm^2$). Here, the predetermined value A corresponds to the minimum flow path area (maximum value: A) between the valve seat 14 and the needle 30 at the valve opening time when the needle 30 is most separated from the valve seat 14. Thus, in the present embodiment, based on the relationship illustrated in FIG. 5, as described above, the minimum flow path area of the throttle flow path 700 during the valve closing time is set to be smaller than the minimum flow path area (maximum value: A) between the valve seat 14 and the needle 30 during the valve opening time in which the needle 30 is most separated from the valve seat 14. Therefore, in the present embodiment, the pulsation rate can be reduced, and the pressure pulsation can be reduced.

The throttle portion 70 is provided in the housing 20, that is, in the fuel injection valve 1. Thus, the fuel injection valve 1 including the throttle portion 70 can be downsized.

Figure 6:
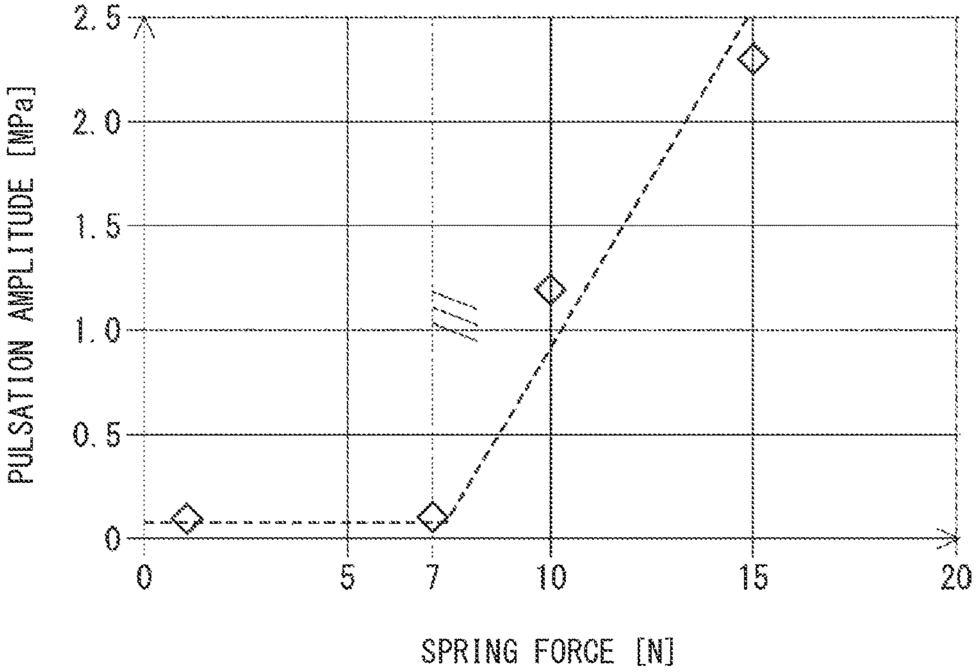
FIG. 6 is a diagram illustrating a relationship between a spring force of a spring of the throttle portion and an amplitude of the pressure pulsation generated in the fuel flow path accompanying the valve closing.

FIG. 6 illustrates a relationship between a spring force (N) of the spring 76 and amplitude (MPa) of the pressure pulsation generated in the fuel flow path 100 accompanying valve closing. As illustrated in FIG. 6, it can be seen that the amplitude of the pressure pulsation can be suppressed to be small when the spring force of the spring 76 is smaller than 7 N. In the present embodiment, the spring force of the spring 76 is set to be smaller than 7 N based on the relationship illustrated in FIG. 6. Therefore, the amplitude of the pressure pulsation generated in the fuel flow path 100 accompanying valve closing can be suppressed to be small.

The throttle portion 70 is disposed on the upstream side of the needle 30 and the movable core 40 in the fuel flow. Therefore, the pulsation that occurs accompanying the reciprocating movement of the needle 30 and the movable core 40 in the axial direction can also be reduced by the throttle portion 70.

Figure 7:
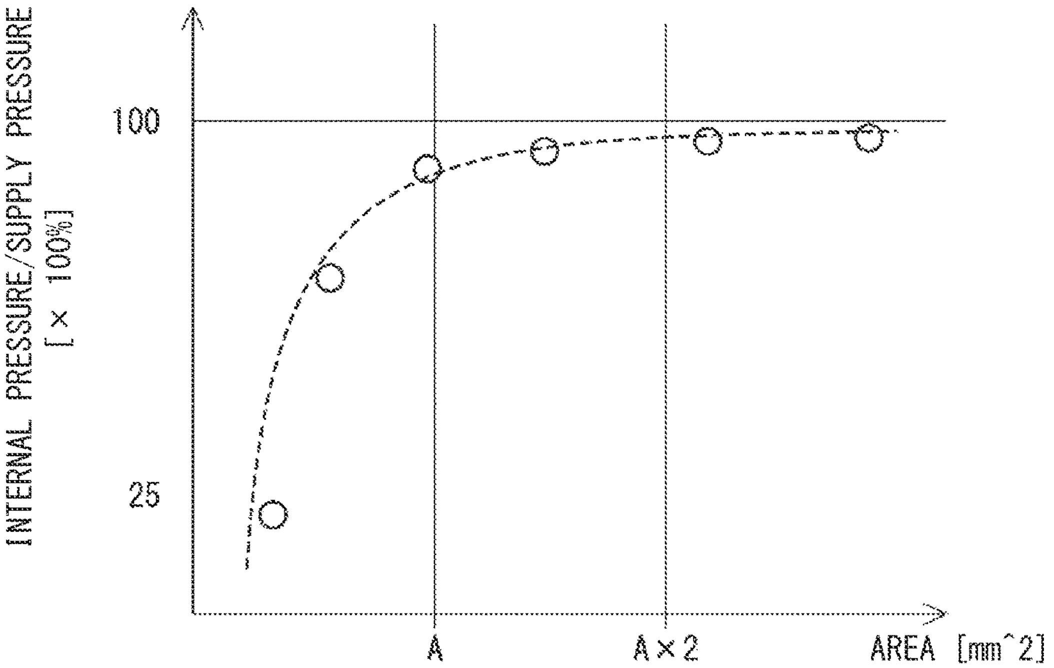
FIG. 7 is a diagram illustrating a relationship between the minimum flow path area of the throttle flow path during a valve opening time and a ratio between an internal pressure of the fuel injection valve and a supply pressure of the fuel to the fuel injection valve.

The relationship between the minimum flow path area ($mm^2$) of the throttle flow path 700 (throttle flow path 701 and throttle flow path 702) during the valve opening time of the needle 30 and the ratio (×100%) of the internal pressure of the fuel injection valve 1 to the fuel supply pressure to the fuel injection valve 1 is illustrated in FIG. 7. As illustrated in FIG. 7, it can be seen that the ratio between the internal pressure and the supply pressure can be increased when the minimum flow path area of the throttle flow path 700 (throttle flow path 701 and throttle flow path 702) during the valve opening time of the needle 30 is larger than the predetermined value A. Accordingly, in the present embodiment, the minimum flow path area of the throttle flow path 700 (throttle flow path 701 and throttle flow path 702) during the valve opening time of the needle 30 is set to be larger than the minimum flow path area (maximum value: A) between the valve seat 14 and the needle 30 during the valve opening time in which the needle 30 is most separated from the valve seat 14, based on the relationship illustrated in FIG. 7.

Thus, during the full lift of the needle 30, the fuel is not throttled by the throttle flow path 700 (throttle flow path 701 and throttle flow path 702), and the ratio between the internal pressure and the supply pressure can be increased, so that the fuel injection pressure can be increased. By setting in this manner, it is possible to suppress a decrease in the flow rate of the fuel during the full lift of the needle 30.

In the present embodiment, an inner diameter of the throttle flow path 701 is set to, for example, 0.3±0.1 mm in consideration of machining tolerance. Therefore, the minimum flow path area of the throttle flow path 700 during the valve closing time corresponds to the area of a circle having a diameter of 0.3±0.1 mm. In the present embodiment, the minimum flow path area of the throttle flow path 700 during the valve opening time is set to correspond to the area of a circle having a diameter of 0.8±0.1 mm. Therefore, it is possible to effectively reduce the pressure pulsation after valve closing while effectively suppressing a decrease in the pressure of the fuel during the valve opening time.

Figure 8:
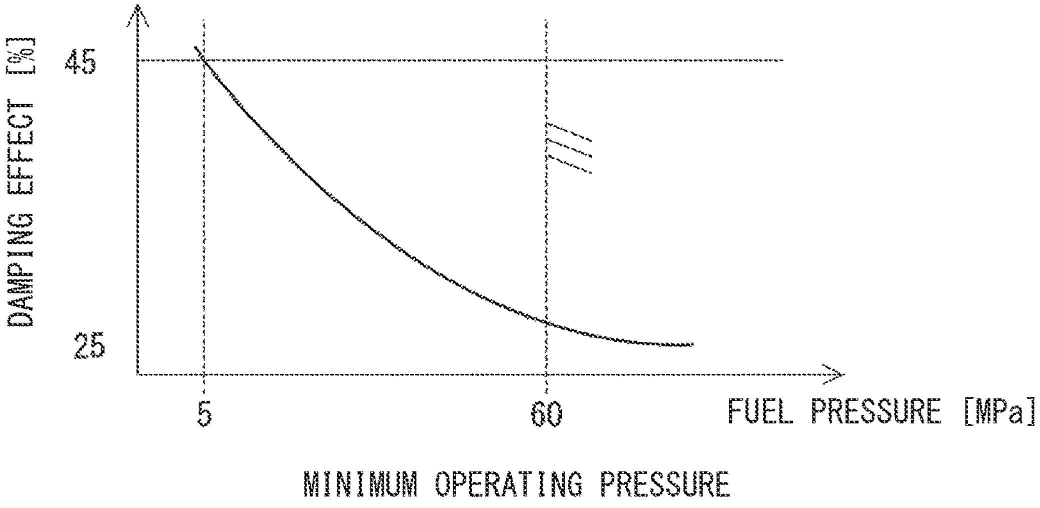
FIG. 8 is a diagram illustrating a relationship between a minimum value of a pressure of the fuel supplied to the fuel injection valve and a damping effect of the pressure pulsation by the throttle portion.

FIG. 8 illustrates the relationship between the minimum value of the pressure (fuel pressure) of the fuel supplied to the fuel injection valve 1, that is, the minimum operating pressure (MPa) and a damping effect (%) of the pressure pulsation by the throttle portion 70. As illustrated in FIG. 8, it can be seen that the damping effect of the pressure pulsation by the throttle portion 70 is enhanced when the minimum operating pressure is equal to or less than 60 MPa. In the present embodiment, the minimum operating pressure is set to be equal to or less than 60 MPa based on the relationship illustrated in FIG. 8. That is, in the present embodiment, the damping effect of the pressure pulsation is high when the minimum operating pressure is equal to or less than 60 MPa.

In the present embodiment, the movable range (dl illustrated in FIG. 3) of the movable part 73 with respect to the housing 20 is set by a press-fitting amount of the restriction portion 75 into the throttle cylindrical portion 71. Thus, the maximum value of the minimum flow path area of the throttle flow path 702 can be easily adjusted by adjusting the movable range of the movable part 73.

In the present embodiment, the seat portion 72 and the throttle cylindrical portion 71 are formed by a material having higher hardness than the spring seat portion 74 and the restriction portion 75. Therefore, wear of the seat 721 can be suppressed, and the spring seat portion 74 and the restriction portion 75 can be easily press-fitted into the throttle cylindrical portion 71.

In the present embodiment, surface roughness of the outer wall of the movable bottom portion 732 of the movable part 73 is smaller than surface roughness of the seat 721. Therefore, robustness can be improved.

In the present embodiment, the outer wall of the movable bottom portion 732 of the movable part 73 is formed in the SR shape. Therefore, the linking force generated between the movable bottom portion 732 and the seat 721 can be increased, and a bounce of the movable part 73 with respect to the seat 721 can be suppressed.

In the present embodiment, the throttle flow path 701 is formed in the movable part 73. That is, the movable part 73 forms the throttle flow path 701. The throttle flow path 702 is formed between the movable part 73 and the seat portion 72 which is another member. That is, the movable part 73 and the seat portion 72 form the throttle flow path 702.

As described above, in the present embodiment, the throttle portion 70 is provided on the upstream side of the fuel flow with respect to the valve seat 14. The throttle portion 70 includes the movable part 73 and the throttle flow path 700 (throttle flow path 701 and throttle flow path 702). The movable part 73 is relatively movable with respect to the housing 20. The throttle flow path 700 is formed so that the fuel can flow, and the minimum flow path area changes when the movable part 73 moves relative to the housing 20.

The minimum flow path area of the throttle flow path 700 during the valve opening time in which the needle 30 separates from the valve seat 14 is larger than the minimum flow path area of the throttle flow path 700 during the valve closing time in which the needle 30 is abutted on the valve seat 14. The minimum flow path area of the throttle flow path 700 during the valve opening time is larger than the minimum flow path area between the valve seat 14 and the needle 30 during the valve opening time in which the needle 30 is most separated from the valve seat 14. The maximum value of the minimum flow path area of the throttle flow path 700 during the valve opening time is regulated to be constant. The needle 30 is formed separately from the throttle portion 70 so as to be relatively movable with respect to the throttle portion 70, and is provided between the valve seat 14 and the throttle portion 70.

In the present embodiment, during the valve opening time in which the needle 30 separates from the valve seat 14, the fuel passes through the throttle flow path 700 and flows toward the injection hole 13 side. Here, the minimum flow path area of the throttle flow path 700 during the valve opening time in which the needle 30 separates from the valve seat 14 is larger than the minimum flow path area of the throttle flow path 700 during the valve closing time in which the needle 30 is abutted on the valve seat 14. The minimum flow path area of the throttle flow path 700 during the valve opening time is larger than the minimum flow path area between the valve seat 14 and the needle 30 during the valve opening time in which the needle 30 is most separated from the valve seat 14. Therefore, the fuel on the side opposite to the injection hole 13 with respect to the throttle flow path 700 flows toward the injection hole 13 side without being throttled by the throttle flow path 700. Thus, it is possible to suppress a decrease in the pressure of the fuel during the valve opening time and to secure the injection amount of the fuel.

On the other hand, the pressure pulsation generated during the valve closing time in which the needle 30 is abutted on the valve seat 14 is transmitted through the fuel flow path 100 from the valve seat 14 side to the throttle portion 70 side, and passes through the throttle flow path 700. Here, the minimum flow path area of the throttle flow path 700 during the valve opening time is larger than the minimum flow path area of the throttle flow path 700 during the valve closing time. That is, the minimum flow path area of the throttle flow path 700 during the valve closing time is smaller than the minimum flow path area of the throttle flow path 700 during the valve opening time. Therefore, the pressure pulsation generated during the valve closing time attenuates when passing through the throttle flow path 700. Thus, the pressure pulsation after valve closing can be reduced.

The needle 30 is formed separately from the throttle portion 70 so as to be relatively movable with respect to the throttle portion 70, and is provided between the valve seat 14 and the throttle portion 70. Thus, when the needle 30 reciprocates in the axial direction in the fuel flow path 100, the throttle portion 70 does not move integrally with the needle 30. Therefore, the throttle portion 70 does not become fluid resistance during the valve opening or closing time of the needle 30, and a decrease in speed of valve opening or closing by the needle 30 can be suppressed.

In the present embodiment, the minimum flow path area of the throttle flow path 700 increases or decreases when the movable part 73 moves relative to the housing 20 due to the differential pressure by valve opening and closing by the needle 30. Therefore, the timing of valve opening or closing by the needle 30 and the timing of a change in the minimum flow path area of the throttle flow path 700 can be linked.

In the present embodiment, the maximum value of the distance by which the movable part 73 is relatively movable with respect to the housing 20 is smaller than the maximum value of the movable distance of the needle 30 from the valve seat 14. Thus, the switching time of the minimum flow path area in the throttle portion 70 can be shortened. Therefore, responsiveness of the throttle portion 70 can be improved.

In the present embodiment, the minimum flow path area of the throttle flow path 700 during the valve closing time is smaller than the minimum flow path area between the valve seat 14 and the needle 30 during the valve opening time in which the needle 30 is most separated from the valve seat 14. Therefore, in the present embodiment, the pulsation rate can be reduced, and the pressure pulsation can be reduced.

Second Embodiment

Figure 9:
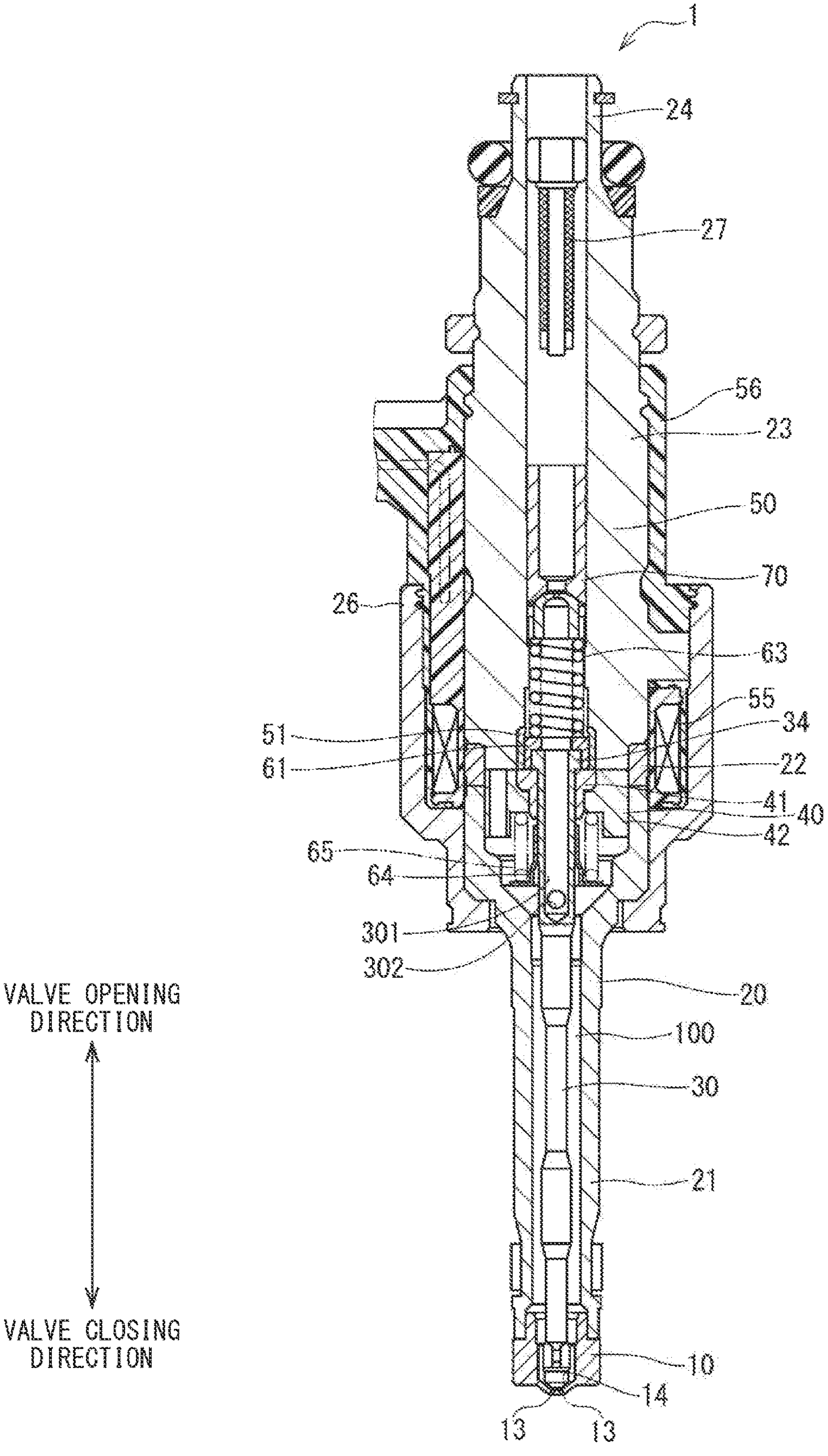
FIG. 9 is a cross-sectional view illustrating the fuel injection valve according to a second embodiment.

FIG. 9 illustrates a fuel injection valve according to a second embodiment. The second embodiment is different from the first embodiment in the configuration of the throttle portion 70, and the like.

In the present embodiment, a filter 27 is provided inside the inlet portion 24. The filter 27 can collect foreign substances in the fuel flowing through the fuel flow path 100.

Figure 10:
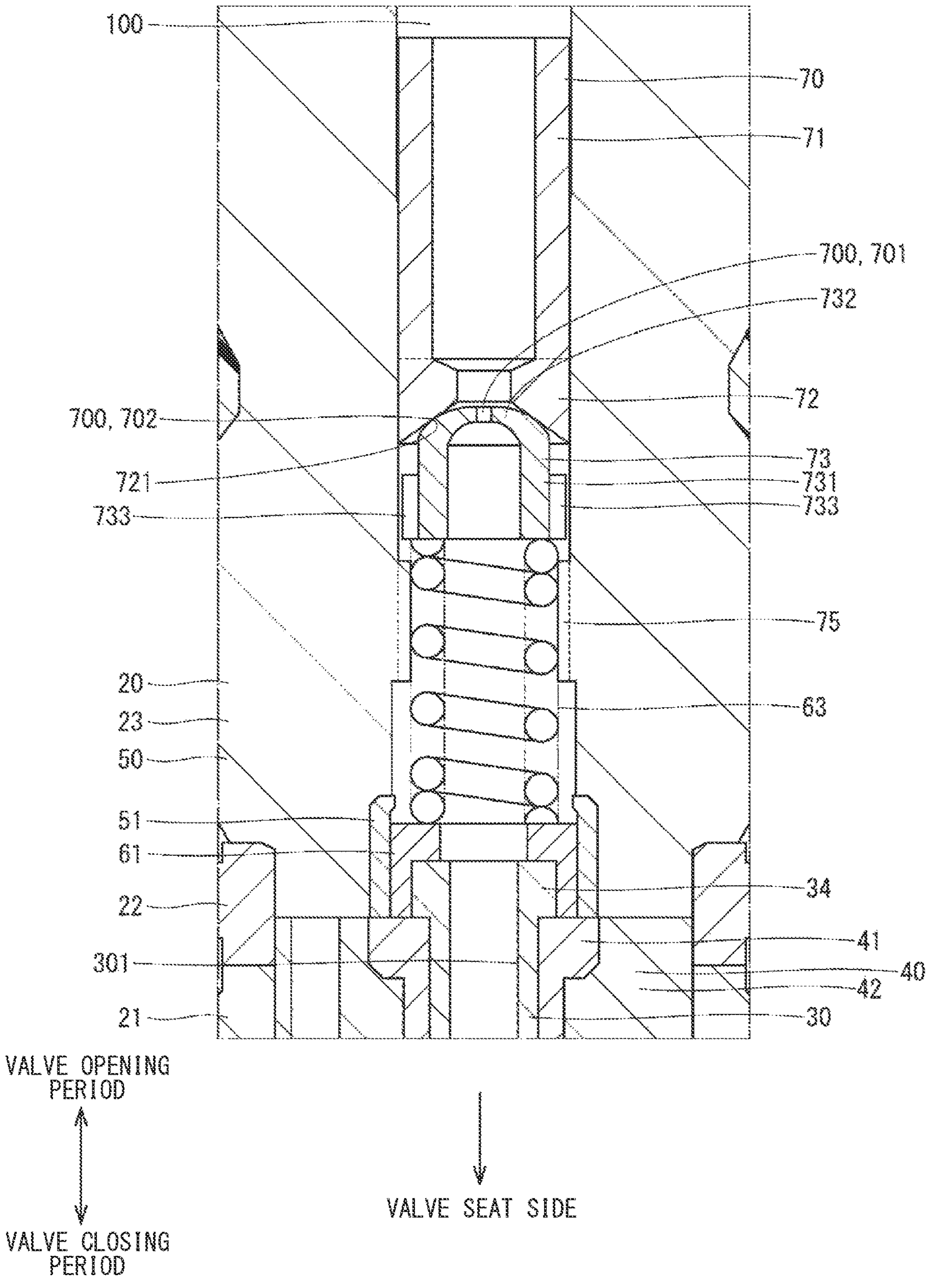
FIG. 10 is a cross-sectional view illustrating a throttle portion of the fuel injection valve according to the second embodiment.

As illustrated in FIG. 10, the throttle portion 70 does not include the spring seat portion 74, the restriction portion 75, and the spring 76 illustrated in the first embodiment. The seat 721 is formed on an end surface of the seat portion 72 on a side opposite to the throttle cylindrical portion 71. The seat 721 is formed in a tapered shape so as to be away from the axis of the seat portion 72 from the throttle cylindrical portion 71 side toward the side opposite to the throttle cylindrical portion 71.

In the present embodiment, the adjusting pipe 62 illustrated in the first embodiment is not provided. The throttle cylindrical portion 71 and the seat portion 72 are press-fitted into the fixed core portion 50 so that the seat 721 faces the valve seat 14 side.

The movable part 73 is provided on the valve seat 14 side with respect to the seat 721 inside the fixed core portion 50 so that the movable bottom portion 732 can be abutted on the seat 721. The spring 63 is provided so that an end portion on a side opposite to the gap forming member 61 is abutted on a surface of the movable part 73 on the valve seat 14 side. Thus, the spring 63 biases the gap forming member 61 and the needle 30 in the valve closing direction and biases the movable part 73 toward the seat 721 side.

In the present embodiment, the restriction portion 75 is formed in a substantially cylindrical shape so as to protrude radially inward from an inner peripheral wall of the fixed core portion 50. The guide portion 733 of the movable part 73 is slidable with the inner peripheral wall of the fixed core portion 50. The guide portion 733 of the movable part 73 can abut on a surface of the restriction portion 75 on a side opposite to the valve seat 14. When the guide portion 733 is abutted on the restriction portion 75, the movement of the movable part 73 toward the valve seat 14 side is restricted.

The throttle flow path 702 is annularly formed between the outer wall of the movable bottom portion 732 and the seat 721.

When the needle 30 separates from the valve seat 14 to open the valve, the pressure of the fuel on the valve seat 14 side with respect to the movable part 73 of the throttle portion 70 in the fuel flow path 100 becomes lower than the pressure of the fuel on the side opposite to the valve seat 14 with respect to the movable part 73. Thus, a differential pressure is generated between the valve seat 14 side and the side opposite to the valve seat 14 with respect to the movable part 73. Therefore, the movable part 73 separates from the seat 721 and moves toward the valve seat 14 side against the biasing force of the spring 63.

Thus, the minimum flow path area of the throttle flow path 702 between the movable part 73 and the seat 721 increases, and the fuel on the side opposite to the valve seat 14 with respect to the movable part 73 flows toward the valve seat 14 side via the throttle flow path 701 and the throttle flow path 702.

Here, the movement of the movable part 73 toward the valve seat 14 side is restricted by the guide portion 733 abutting on the restriction portion 75. Thus, the maximum value of the minimum flow path area of the throttle flow path 700 (throttle flow path 701 and throttle flow path 702) during the valve opening time is regulated to be constant.

When the needle 30 is abutted on the valve seat 14 to close the valve, the pressure of the fuel on the valve seat 14 side with respect to the movable part 73 of the throttle portion 70 in the fuel flow path 100 becomes equal to the pressure of the fuel on the side opposite to the valve seat 14 with respect to the movable part 73. Therefore, the movable part 73 moves to the side opposite to the valve seat 14 by the biasing force of the spring 63 and is abutted on the seat 721.

Thus, the minimum flow path area of the throttle flow path 702 between the movable part 73 and the seat 721 becomes zero. Therefore, the pressure wave generated in the vicinity of the valve seat 14 during the valve closing time passes only through the throttle flow path 701 and propagates to the pipe side. The pressure wave attenuates when passing through the throttle flow path 701.

The throttle portion 70 is provided on the upstream side of the fuel flow with respect to the valve seat 14. The throttle portion 70 includes the movable part 73 and the throttle flow path 700 (throttle flow path 701 and throttle flow path 702). The movable part 73 is relatively movable with respect to the housing 20. The throttle flow path 700 is formed so that the fuel can flow, and the minimum flow path area changes when the movable part 73 moves relative to the housing 20.

The minimum flow path area of the throttle flow path 700 during the valve opening time in which the needle 30 separates from the valve seat 14 is larger than the minimum flow path area of the throttle flow path 700 during the valve closing time in which the needle 30 is abutted on the valve seat 14. The minimum flow path area of the throttle flow path 700 during the valve opening time is larger than the minimum flow path area between the valve seat 14 and the needle 30 during the valve opening time in which the needle 30 is most separated from the valve seat 14. The maximum value of the minimum flow path area of the throttle flow path 700 during the valve opening time is regulated to be constant. The needle 30 is provided between the valve seat 14 and the throttle portion 70.

The minimum flow path area of the throttle flow path 700 increases or decreases as the movable part 73 moves relative to the housing 20 due to the differential pressure by valve opening and closing by the needle 30.

The maximum value of the distance by which the movable part 73 is relatively movable with respect to the housing 20 is smaller than the maximum value of the movable distance of the needle 30 from the valve seat 14.

The minimum flow path area of the throttle flow path 700 during the valve closing time is smaller than the minimum flow path area between the valve seat 14 and the needle 30 during the valve opening time in which the needle 30 is most separated from the valve seat 14, that is, during full lift of the needle 30.

As described above, also in the second embodiment, as in the first embodiment, it is possible to reduce the pressure pulsation after valve closing while suppressing the decrease in the pressure of the fuel during the valve opening time.

Third Embodiment

Figure 11:
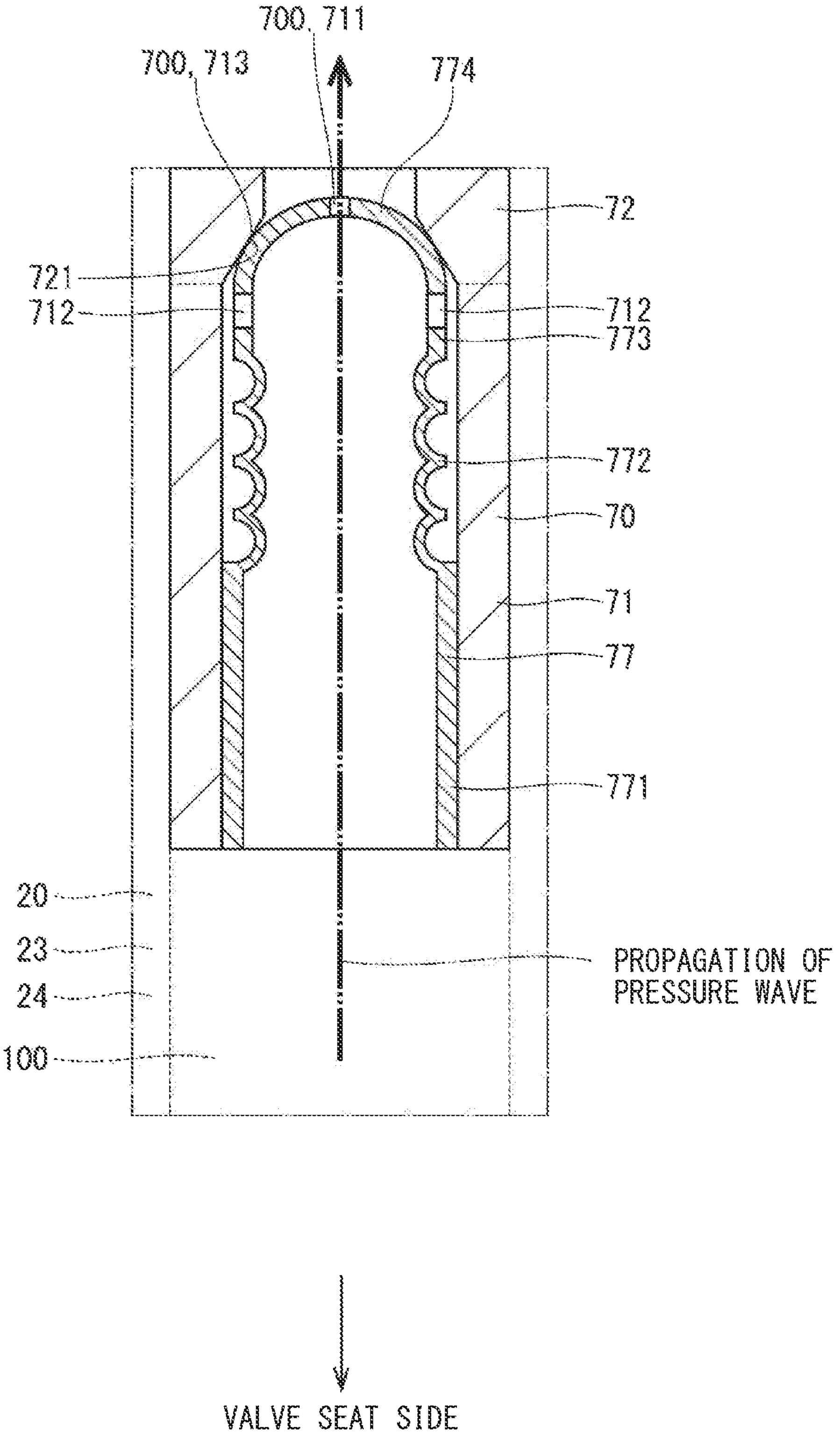
FIG. 11 is a cross-sectional view illustrating a throttle portion of the fuel injection valve according to a third embodiment.

FIG. 11 illustrates a part of the fuel injection valve according to a third embodiment. The third embodiment is different from the first embodiment in the configuration of the throttle portion 70, and the like.

In the present embodiment, the throttle portion 70 includes a movable part 77 instead of the movable part 73, the spring seat portion 74, the restriction portion 75, and the spring 76 illustrated in the first embodiment. The throttle portion 70 includes a throttle flow path 711, a throttle flow path 712, and a throttle flow path 713 instead of the throttle flow path 701 and the throttle flow path 702 illustrated in the first embodiment.

The movable part 77 is formed by, for example, metal. The movable part 77 includes a fixed cylindrical portion 771, an elastic deformation portion 772, a movable cylindrical portion 773, and a movable bottom portion 774.

The fixed cylindrical portion 771 is formed in a substantially cylindrical shape. The elastically deformation portion 772 is formed in a bellows shape. The elastically deformation portion 772 is formed integrally with the fixed cylindrical portion 771 so that one end thereof is connected to the end portion of the fixed cylindrical portion 771. The elastically deformation portion 772 can expand and contract by being elastically deformed in the axial direction.

The movable cylindrical portion 773 is formed in a substantially cylindrical shape. The movable cylindrical portion 773 is formed integrally with the elastic deformation portion 772 so that one end thereof is connected to an end portion of the elastic deformation portion 772 on a side opposite to the fixed cylindrical portion 771.

The movable bottom portion 774 is formed integrally with the movable cylindrical portion 773 so as to close an end portion of the movable cylindrical portion 773 on a side opposite to the elastic deformation portion 772. An inner wall and an outer wall of the movable bottom portion 774 are formed in a curved surface shape projecting to the side opposite to the movable cylindrical portion 773. More specifically, the outer wall of the movable bottom portion 774 is formed in the SR shape.

The movable part 77 is provided inside the throttle cylindrical portion 71 so that the outer wall of the movable bottom portion 774 is abutted on the seat 721. Here, the fixed cylindrical portion 771 is press-fitted into the throttle cylindrical portion 71. The elastic deformation portion 772 biases the movable cylindrical portion 773 and the movable bottom portion 774 toward the seat 721 side. Thus, the outer wall of the movable bottom portion 774 is pressed against the seat 721 (see FIG. 11).

The movable bottom portion 774 and the movable cylindrical portion 773 are movable toward the fixed cylindrical portion 771 side against a biasing force of the elastic deformation portion 772. Here, the elastic deformation portion 772 restricts movement of the movable bottom portion 774 and the movable cylindrical portion 773 toward the fixed cylindrical portion 771 side in a most compressed state in the axial direction (see FIG. 12). At this time, the elastic deformation portion 772 corresponds to a "restriction portion".

When the movable bottom portion 774 and the movable cylindrical portion 773 move relative to the housing 20 toward the fixed cylindrical portion 771 side, the movable bottom portion 774 separates from the seat 721.

The throttle flow path 711 is formed so as to penetrate the center of the movable bottom portion 774 in the plate thickness direction. Thus, the fuel can flow through the throttle flow path 711.

The throttle flow path 712 is formed to penetrate the movable cylindrical portion 773 in the radial direction. Thus, the fuel can flow through the throttle flow path 712. Two throttle flow paths 712 are formed at equal intervals in the circumferential direction of the movable cylindrical portion 773.

The throttle flow path 713 is annularly formed between the movable bottom portion 774 of the movable part 77 and the seat 721. When the movable bottom portion 774 of the movable part 77 is separated from the seat 721, the fuel can flow through the throttle flow path 713. A minimum flow path area of the throttle flow path 713 is zero when the movable bottom portion 774 is abutted on the seat 721 (see FIG. 11). Thus, at this time, the fuel cannot flow through the throttle flow path 713. On the other hand, the minimum flow path area of the throttle flow path 713 is maximized when the movable bottom portion 774 separates from the seat 721 and movement toward the fixed cylindrical portion 771 side is restricted by the elastic deformation portion 772 (see FIG. 12). Here, the throttle flow path 711, the throttle flow path 712, and the throttle flow path 713 are collectively referred to as the throttle flow path 700.

Next, operation of the throttle portion 70 will be described.

When the needle 30 separates from the valve seat 14 to open the valve, the pressure of the fuel on the valve seat 14 side with respect to the movable bottom portion 774 of the movable part 77 of the throttle portion 70 in the fuel flow path 100 becomes lower than the pressure of the fuel on the side opposite to the valve seat 14 with respect to the movable bottom portion 774. Thus, a differential pressure is generated between the valve seat 14 side and the side opposite to the valve seat 14 with respect to the movable bottom portion 774. Therefore, the movable bottom portion 774 separates from the seat 721 and moves toward the valve seat 14 side against the biasing force of the elastic deformation portion 772 (see FIG. 12).

Thus, the minimum flow path area of the throttle flow path 713 between the movable bottom portion 774 and the seat 721 increases, and the fuel on the side opposite to the valve seat 14 with respect to the movable bottom portion 774 flows toward the valve seat 14 side via the throttle flow path 711, the throttle flow path 713, and the throttle flow path 712.

Figure 12:
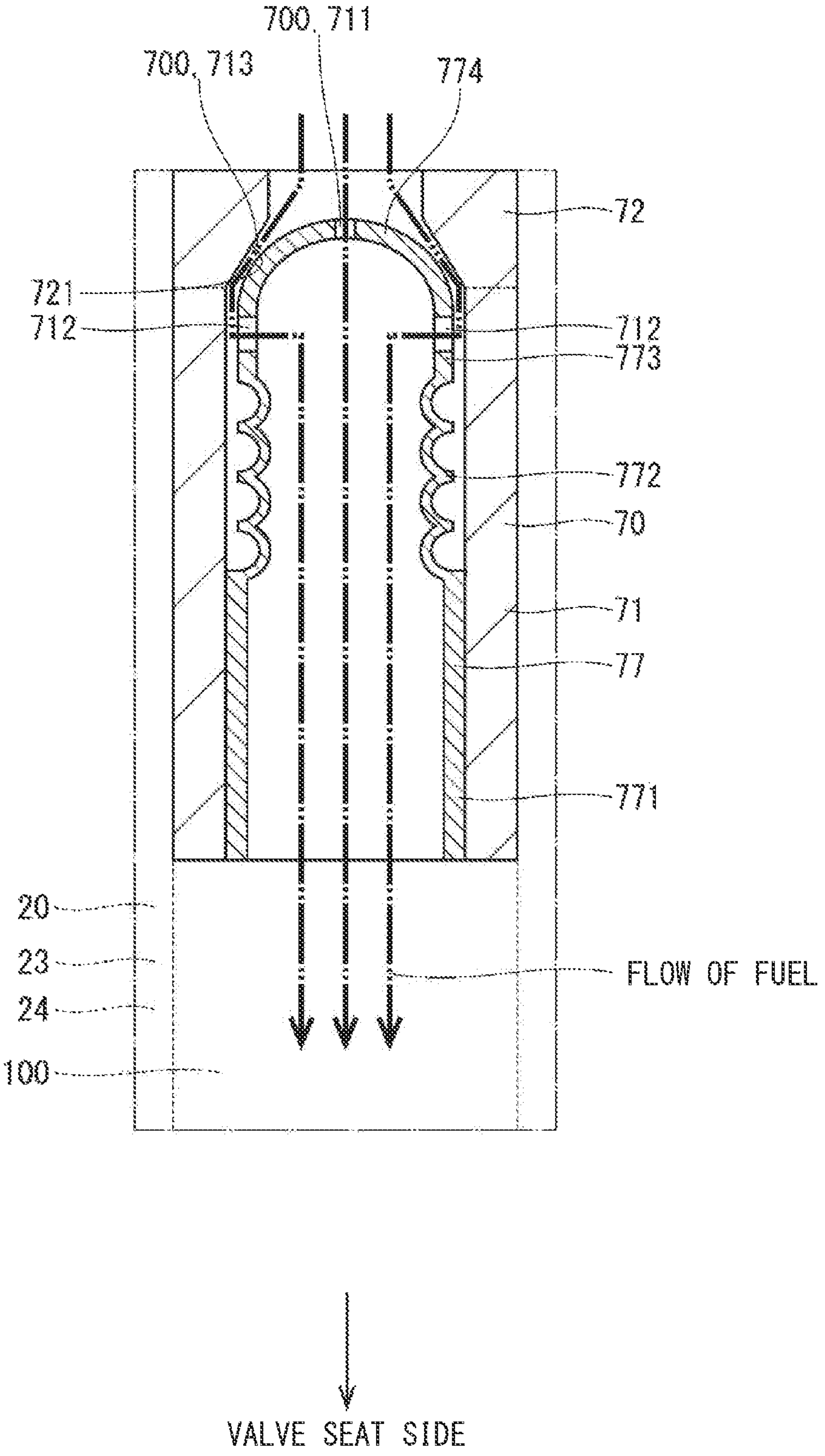
FIG. 12 is a cross-sectional view illustrating a throttle portion of the fuel injection valve according to the third embodiment.

Here, movement of the movable bottom portion 774 and the movable cylindrical portion 773 toward the valve seat 14 side is restricted as the elastic deformation portion 772 is in the most compressed state in the axial direction (see FIG. 12). Thus, the maximum value of the minimum flow path area of the throttle flow path 700 (throttle flow path 711, throttle flow path 712, and throttle flow path 713) during the valve opening time is regulated to be constant. At this time, the maximum value of the minimum flow path area of the throttle flow path 700 (throttle flow path 711, throttle flow path 712, and the throttle flow path 713) is relatively large. Therefore, the fuel is prevented from being throttled by the throttle flow path 700, and the flow rate of the fuel flowing from the pipe side to the valve seat 14 side can be sufficiently secured.

When the needle 30 is abutted on the valve seat 14 to close the valve, the pressure of the fuel on the side of the valve seat 14 with respect to the movable bottom portion 774 of the throttle portion 70 in the fuel flow path 100 becomes equal to the pressure of the fuel on the side opposite to the valve seat 14 with respect to the movable bottom portion 774. Therefore, the movable bottom portion 774 moves to the side opposite to the valve seat 14 by the biasing force of the elastic deformation portion 772 and is abutted on the seat 721 (see FIG. 11).

Thus, the minimum flow path area of the throttle flow path 713 between the movable bottom portion 774 and the seat 721 becomes zero. Therefore, the pressure wave generated in the vicinity of the valve seat 14 during the valve closing time passes only through the throttle flow path 711 and propagates to the pipe side. The pressure wave attenuates when passing through the throttle flow path 711.

Here, the minimum flow path area of the throttle flow path 700 (throttle flow path 711, throttle flow path 712, and throttle flow path 713) during the valve closing time is smaller than the minimum flow path area of the throttle flow path 700 (throttle flow path 711, throttle flow path 712, and throttle flow path 713) during the valve opening time.

The throttle portion 70 is provided on the upstream side of the fuel flow with respect to the valve seat 14. The throttle portion 70 includes the movable part 77 and the throttle flow path 700 (throttle flow path 711, throttle flow path 712, and throttle flow path 713). The movable bottom portion 774 of the movable part 77 is relatively movable with respect to the housing 20. The throttle flow path 700 is formed so that the fuel can flow, and the minimum flow path area changes when the movable bottom portion 774 moves relative to the housing 20.

The minimum flow path area of the throttle flow path 700 during the valve opening time in which the needle 30 separates from the valve seat 14 is larger than the minimum flow path area of the throttle flow path 700 during the valve closing time in which the needle 30 is abutted on the valve seat 14. The minimum flow path area of the throttle flow path 700 during the valve opening time is larger than the minimum flow path area between the valve seat 14 and the needle 30 during the valve opening time in which the needle 30 is most separated from the valve seat 14. The maximum value of the minimum flow path area of the throttle flow path 700 during the valve opening time is regulated to be constant. The needle 30 is provided between the valve seat 14 and the throttle portion 70.

The minimum flow path area of the throttle flow path 700 increases or decreases as the movable bottom portion 774 of the movable part 77 moves relative to the housing 20 due to the differential pressure by valve opening and closing by the needle 30.

The maximum value of the distance by which the movable bottom portion 774 is relatively movable with respect to the housing 20 is smaller than the maximum value of the movable distance of the needle 30 from the valve seat 14.

The minimum flow path area of the throttle flow path 700 during the valve closing time is smaller than the minimum flow path area between the valve seat 14 and the needle 30 during the valve opening time in which the needle 30 is most separated from the valve seat 14, that is, during full lift of the needle 30.

As described above, also in the third embodiment, as in the first embodiment, it is possible to reduce the pressure pulsation after valve closing while suppressing the decrease in the pressure of the fuel during the valve opening time.

Fourth Embodiment

Figure 13:
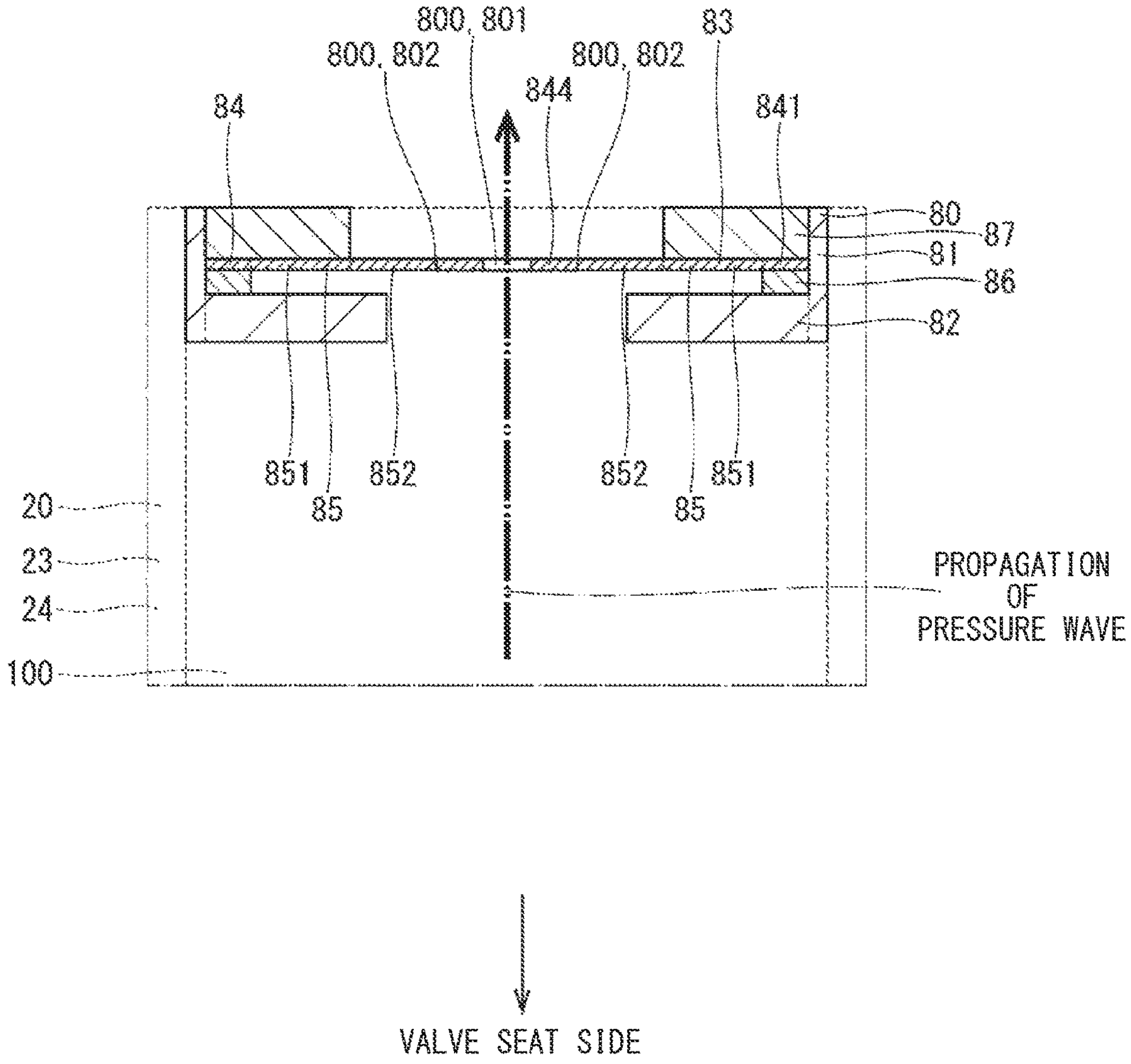
FIG. 13 is a cross-sectional view illustrating a throttle portion of the fuel injection valve according to a fourth embodiment.

FIG. 13 illustrates a part of the fuel injection valve according to a fourth embodiment. The fourth embodiment is different from the first embodiment in the configuration of the throttle portion, and the like.

The present embodiment includes a throttle portion 80 instead of the throttle portion 70 illustrated in the first embodiment. The throttle portion 80 is provided inside the inlet portion 24. The throttle portion 80 includes a throttle cylindrical portion 81, a restriction portion 82, a movable part 83, a lower holding portion 86, an upper holding portion 87, a throttle flow path 801, and a throttle flow path 802.

The throttle cylindrical portion 81 is formed in a substantially cylindrical shape by, for example, metal. The restriction portion 82 is formed in a substantially annular plate shape by, for example, metal. The restriction portion 82 is formed integrally with the throttle cylindrical portion 81 so that an outer peripheral wall is connected to an inner peripheral wall of one end of the throttle cylindrical portion 81.

Figure 14:
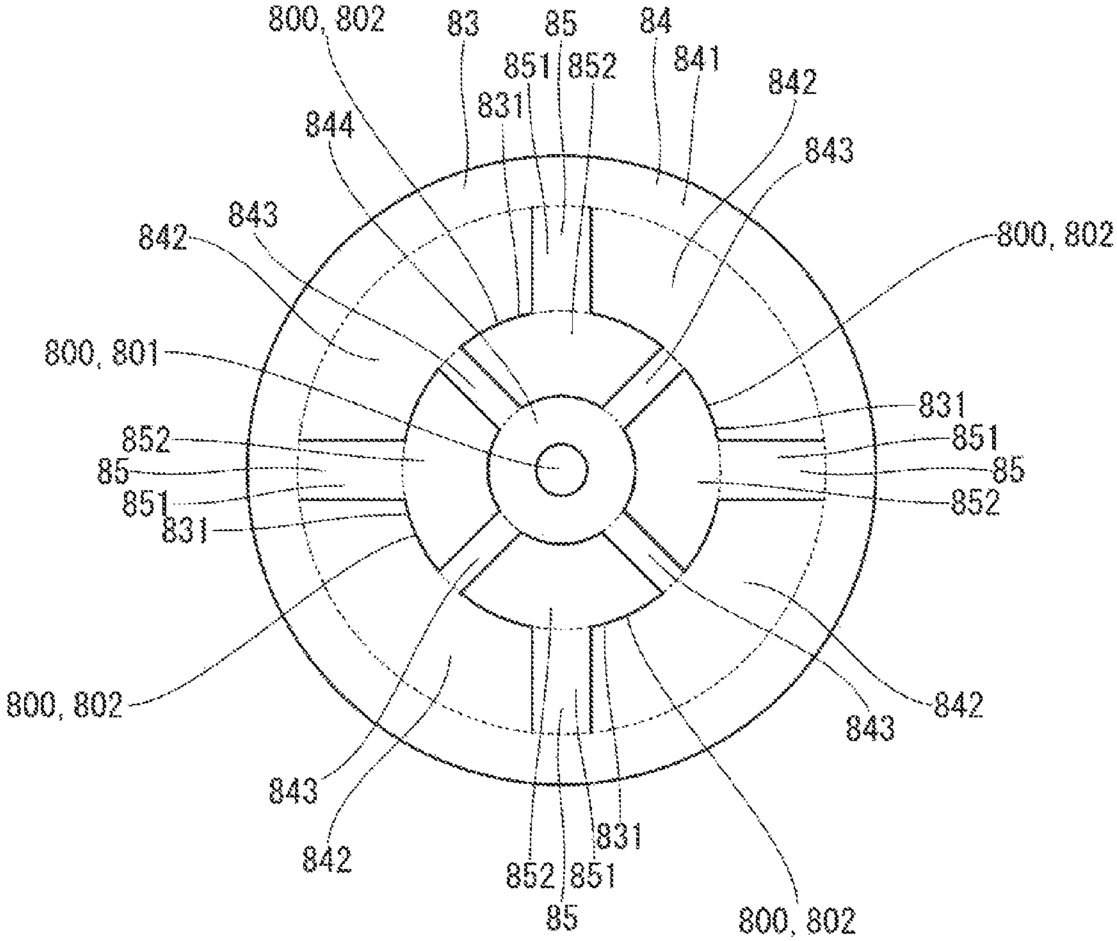
FIG. 14 is a cross-sectional view illustrating a movable part of a throttle portion of the fuel injection valve according to the fourth embodiment.

The movable part 83 is formed in a disk shape by metal, for example. As illustrated in FIG. 14, a cutting portion 831 is formed in the movable part 83. The movable part 83 is divided into a movable piece support 84 and a movable piece 85 by a cutting portion 831.

The movable piece support 84 includes an annular portion 841, projecting portions 842, extension portions 843, and a center portion 844. The annular portion 841 is formed in an annular shape. The projecting portions 842 are formed in an arc shape integrally with the annular portion 841 so as to protrude radially inward from an inner edge portion of the annular portion 841. Four projecting portions 842 are formed at equal intervals in the circumferential direction of the annular portion 841. The extension portions 843 are formed integrally with the projecting portions 842 so as to linearly extend radially inward from centers of the projecting portions 842. The four extension portions 843 correspond to the four projecting portions 842, and are formed at equal intervals in the circumferential direction of the annular portion 841. The center portion 844 is formed integrally with the extension portions 843 so that an outer edge portion is connected to the end portions of the extension portions 843 on a side opposite to the projecting portions 842.

The movable piece 85 includes movable piece arm portions 851 and movable piece main bodies 852. The movable piece arm portions 851 are formed integrally with the annular portion 841 so as to linearly extend radially inward from the annular portion 841 between the two projecting portions 842. The movable piece main bodies 852 are formed integrally with the movable piece arm portions 851 so as to be connected to end portions of the movable piece arm portions 851 on a side opposite to the annular portion 841 among the two projecting portions 842, the two extension portions 843, and the center portion 844. The movable piece main bodies 852 are formed in an arc shape. Four movable piece arm portions 851 and four movable piece main bodies 852 are formed at equal intervals in the circumferential direction of the annular portion 841. The movable piece 85 is deformable so as to be smoothly curved from an end portion on the annular portion 841 side to an end portion on the center portion 844 side (see FIG. 15).

The lower holding portion 86 is formed in a substantially annular plate shape by, for example, metal. The lower holding portion 86 is provided inside the throttle cylindrical portion 81 so that one end surface is in contact with an outer edge portion of an end surface of the restriction portion 75 and an outer peripheral wall is in contact with an inner peripheral wall of the throttle cylindrical portion 81.

The upper holding portion 87 is formed in a substantially annular plate shape by, for example, metal. An outer diameter of the upper holding portion 87 is substantially the same as an outer diameter of the lower holding portion 86. An inner diameter of the upper holding portion 87 is larger than an inner diameter of the restriction portion 82 and smaller than an inner diameter of the lower holding portion 86.

The movable part 83 is provided inside the throttle cylindrical portion 81 so that one surface of the annular portion 841 is in contact with an end surface of the lower holding portion 86 on a side opposite to the restriction portion 82 and an outer edge portion is in contact with the inner peripheral wall of the throttle cylindrical portion 81.

The upper holding portion 87 is provided inside the throttle cylindrical portion 81 so that one end surface is in contact with a surface of the movable part 83 on the side opposite to the restriction portion 82 and an outer peripheral wall is in contact with the inner peripheral wall of the throttle cylindrical portion 81. Thus, the annular portion 841 of the movable part 83 is sandwiched between the lower holding portion 86 and the upper holding portion 87, and is held inside the throttle cylindrical portion 81.

Figure 15:
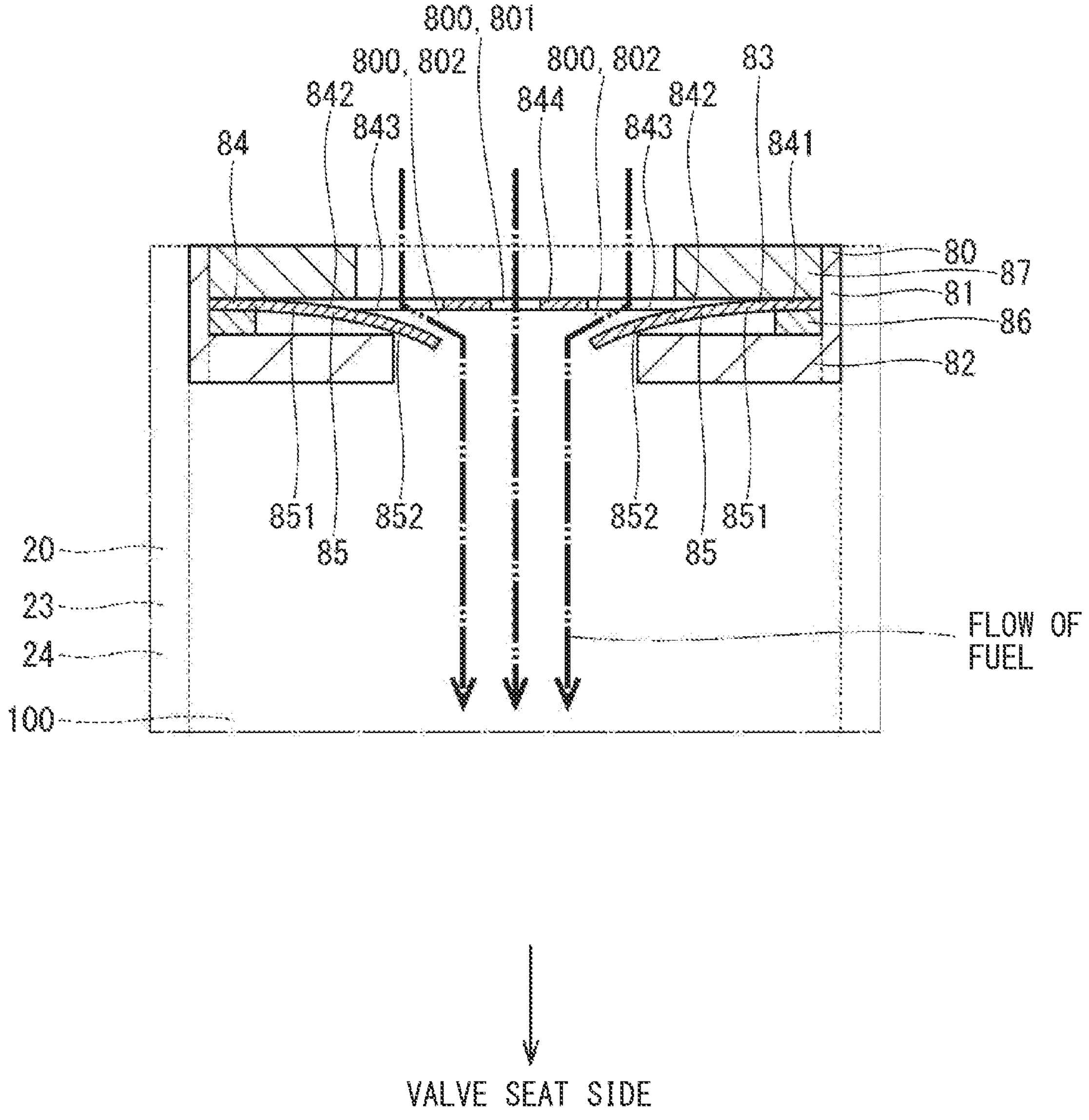
FIG. 15 is a cross-sectional view illustrating a throttle portion of the fuel injection valve according to the fourth embodiment.

The movable piece 85 of the movable part 83 is elastically deformable so as to be smoothly curved toward the restriction portion 82 side from the end portion on the annular portion 841 side to the end portion on the center portion 844 side (see FIG. 15). When the movable piece 85 is abutted on the inner edge portion of the restriction portion 82, deformation toward the restriction portion 82 side is restricted. That is, the restriction portion 82 can restrict the relative movement of the movable piece 85 of the movable part 83 with respect to the housing 20.

The throttle portion 80 is provided inside the inlet portion 24 so that an outer peripheral wall of the throttle cylindrical portion 81 is fitted to the inner peripheral wall of the inlet portion 24. Here, the throttle cylindrical portion 81 is press-fitted into the inlet portion 24.

The throttle flow path 801 is formed so as to pass through the center of the center portion 844 of the movable part 83 in the plate thickness direction. Thus, the fuel can flow through the throttle flow path 801.

The throttle flow path 802 is formed between the cutting portion 831, that is, the projecting portions 842, the extension portions 843, and the center portion 844 of the movable piece support 84 and the movable piece arm portions 851 and the movable piece main bodies 852 of the movable piece 85. When the movable piece 85 is curved toward the restriction portion 82 side, the fuel can flow through the throttle flow path 802. The minimum flow path area of the throttle flow path 802 is zero when the movable piece 85 is not curved toward the restriction portion 82 side and is on the same plane as the movable piece support 84 (see FIG. 13). Therefore, at this time, the fuel cannot flow through the throttle flow path 802. On the other hand, the minimum flow path area of the throttle flow path 802 is maximized when the movable piece 85 is curved toward the restriction portion 82 side and the deformation is restricted by the restriction portion 82 (see FIG. 15). Here, the throttle flow path 801 and the throttle flow path 802 are collectively referred to as a throttle flow path 800.

Next, operation of the throttle portion 80 will be described.

When the needle 30 separates from the valve seat 14 to open the valve, the pressure of the fuel on the valve seat 14 side with respect to the movable part 83 of the throttle portion 80 in the fuel flow path 100 becomes lower than the pressure of the fuel on the side opposite to the valve seat 14 with respect to the movable part 83. Thus, a differential pressure is generated between the valve seat 14 side and the side opposite to the valve seat 14 with respect to the movable part 83. Therefore, the movable piece 85 of the movable part 83 smoothly curves toward the restriction portion 82 side from the end portion on the annular portion 841 side to the end portion on the center portion 844 side (see FIG. 15).

Thus, the minimum flow path area of the throttle flow path 802 between the movable piece support 84 and the movable piece 85 increases, and the fuel on the side opposite to the valve seat 14 with respect to the movable part 83 flows to the valve seat 14 side via the throttle flow path 801 and the throttle flow path 802.

Here, when the movable piece 85 is abutted on the inner edge portion of the restriction portion 82, deformation of the movable piece toward the restriction portion 82 side is restricted (see FIG. 15). Therefore, the maximum value of the minimum flow path area of the throttle flow path 800 (throttle flow path 801 and throttle flow path 802) during the valve opening time is regulated to be constant. At this time, the maximum value of the minimum flow path area of the throttle flow path 800 (throttle flow path 801 and throttle flow path 802) is relatively large. Therefore, the fuel is prevented from being throttled by the throttle flow path 800, and the flow rate of the fuel flowing from the pipe side to the valve seat 14 side can be sufficiently secured.

When the needle 30 is abutted on the valve seat 14 to close the valve, the pressure of the fuel on the valve seat 14 side with respect to the movable part 83 of the throttle portion 80 in the fuel flow path 100 becomes equal to the pressure of the fuel on the side opposite to the valve seat 14 with respect to the movable part 83. Therefore, the movable piece 85 is deformed so that the end portion on the center portion 844 side moves to the upper holding portion 87 side and is located on the same plane as the movable piece support 84 (see FIG. 13).

Thus, the minimum flow path area of the throttle flow path 802 between the movable piece support 84 and the movable piece 85 becomes zero. Therefore, the pressure wave generated in the vicinity of the valve seat 14 during the valve closing time passes only through the throttle flow path 801 and propagates to the pipe side. The pressure wave attenuates when passing through the throttle flow path 801.

Here, the minimum flow path area of the throttle flow path 800 (throttle flow path 801 and throttle flow path 802) during the valve closing time is smaller than the minimum flow path area of the throttle flow path 800 (throttle flow path 801 and throttle flow path 802) during the valve opening time.

The throttle portion 80 is provided on the upstream side of the fuel flow with respect to the valve seat 14. The throttle portion 80 includes the movable part 83 and the throttle flow path 800 (throttle flow path 801 and throttle flow path 802). The movable piece 85 of the movable part 83 is relatively movable with respect to the housing 20. The throttle flow path 800 is formed so that the fuel can flow, and the minimum flow path area changes when the movable piece 85 moves relative to the housing 20.

The minimum flow path area of the throttle flow path 800 during the valve opening time in which the needle 30 separates from the valve seat 14 is larger than the minimum flow path area of the throttle flow path 800 during the valve closing time in which the needle 30 is abutted on the valve seat 14. The minimum flow path area of the throttle flow path 800 during the valve opening time is larger than the minimum flow path area between the valve seat 14 and the needle 30 during the valve opening time in which the needle 30 is most separated from the valve seat 14. The maximum value of the minimum flow path area of the throttle flow path 800 during the valve opening time is regulated to be constant. The needle 30 is provided between the valve seat 14 and the throttle portion 80.

The minimum flow path area of the throttle flow path 800 increases or decreases as the movable piece 85 of the movable part 83 moves relative to the housing 20 due to the differential pressure by valve opening and closing by the needle 30.

The maximum value of the distance by which the movable piece 85 is relatively movable with respect to the housing 20 is smaller than the maximum value of the movable distance of the needle 30 from the valve seat 14.

The minimum flow path area of the throttle flow path 800 during the valve closing time is smaller than the minimum flow path area between the valve seat 14 and the needle 30 during the valve opening time in which the needle 30 is most separated from the valve seat 14, that is, during full lift of the needle 30.

In the present embodiment, the movable range of the movable piece 85 with respect to the housing 20 is set by the plate thickness of the movable part 83 and the size of the inner diameter of the restriction portion 82. Therefore, by adjusting the movable range of the movable piece 85, the maximum value of the minimum flow path area of the throttle flow path 802 can be easily adjusted.

As described above, also in the fourth embodiment, as in the first embodiment, it is possible to reduce the pressure pulsation after valve closing while suppressing the decrease in the pressure of the fuel during the valve opening time.

Fifth Embodiment

Figure 16:
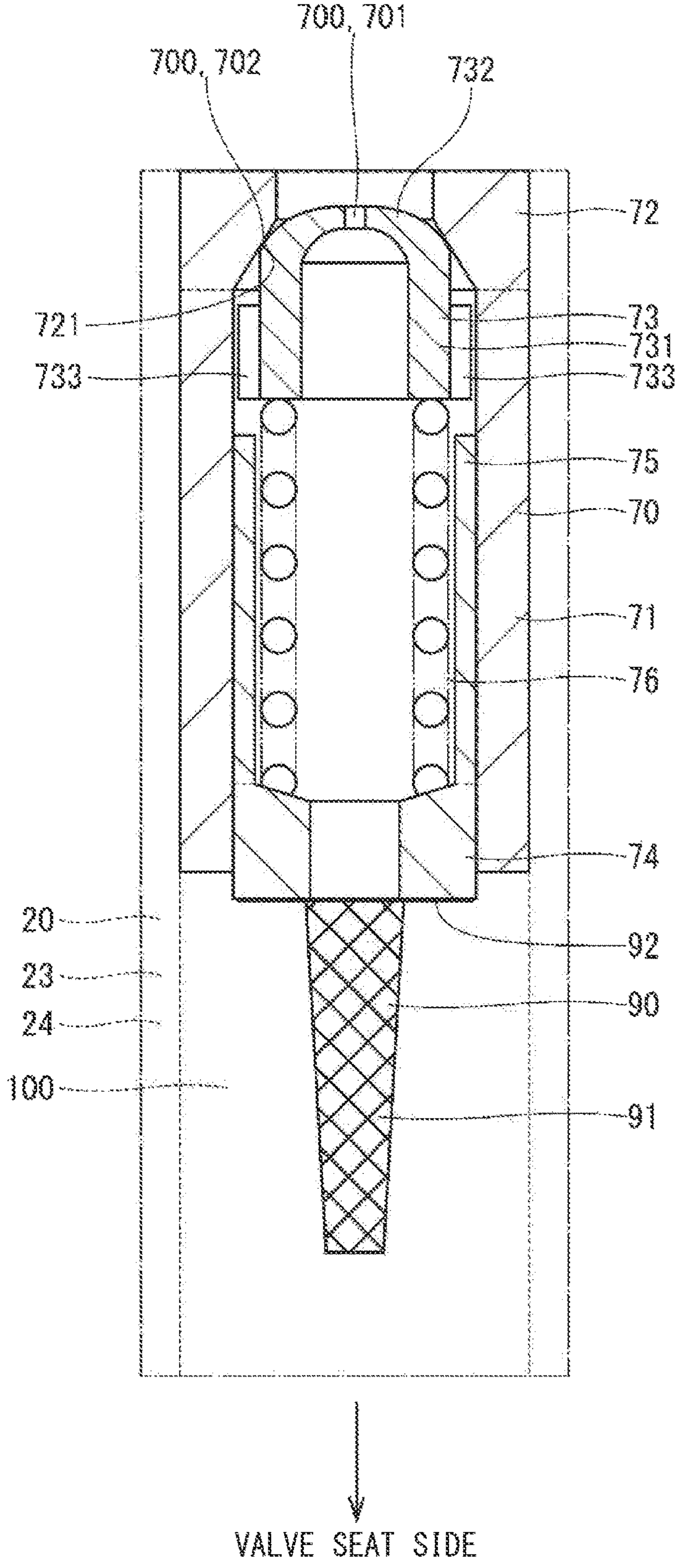
FIG. 16 is a cross-sectional view illustrating a throttle portion of the fuel injection valve according to a fifth embodiment.

FIG. 16 illustrates a part of the fuel injection valve according to a fifth embodiment. The fifth embodiment is different from the first embodiment in the configuration of the throttle portion 70, and the like.

In the present embodiment, the throttle portion 70 further includes a filter 90. The filter 90 includes a filter portion 91 and a flange portion 92.

The filter portion 91 is formed in a bottomed cylindrical shape by a mesh-shaped member. The flange portion 92 is formed in an annular shape so as to extend radially outward from an end portion of the filter portion 91 on the opening side.

The filter 90 is provided integrally with the spring seat portion 74 so that an end surface of the flange portion 92 on a side opposite to the filter portion 91 is fixed to an end surface of the spring seat portion 74 on a side opposite to the restriction portion 75. The filter 90 can collect foreign matter in the fuel passing through the filter portion 91.

The flow path area of the filter portion 91 is larger than the maximum value of the minimum flow path area of the throttle flow path 700 (throttle flow path 701 and throttle flow path 702).

Also in the fifth embodiment, as in the first embodiment, it is possible to reduce the pressure pulsation after valve closing while suppressing a decrease in the pressure of the fuel during the valve opening time.

Sixth Embodiment

Figure 17:
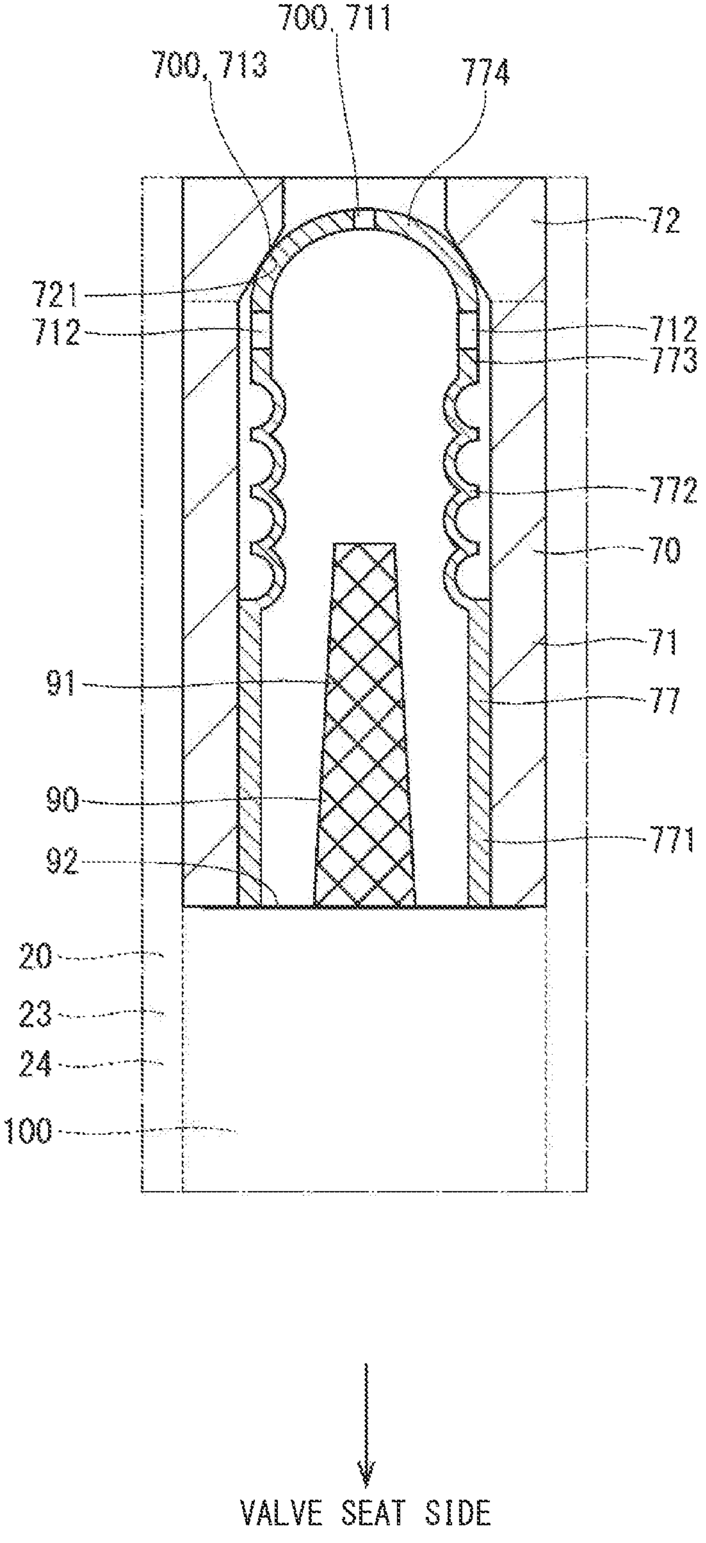
FIG. 17 is a cross-sectional view illustrating a throttle portion of the fuel injection valve according to a sixth embodiment.

FIG. 17 illustrates a part of a fuel injection valve according to a sixth embodiment. The sixth embodiment is different from the third embodiment in the configuration of the throttle portion 70, and the like.

In the present embodiment, the throttle portion 70 further includes a filter 90. The configuration of the filter 90 is substantially similar to that of the fifth embodiment, and thus the description thereof will be omitted.

The filter 90 is provided integrally with the throttle cylindrical portion 71 so that an outer edge portion of an end surface of the flange portion 92 on the filter portion 91 side is fixed to an end surface of the throttle cylindrical portion 71 on a side opposite to the seat portion 72. Here, the filter portion 91 is located inside the throttle cylindrical portion 71 and the movable part 77. The filter 90 can collect foreign matter in the fuel passing through the filter portion 91.

The flow path area of the filter portion 91 is larger than the maximum value of the minimum flow path area of the throttle flow path 700 (throttle flow path 711, throttle flow path 712, and throttle flow path 713).

Also in the sixth embodiment, as in the third embodiment, it is possible to reduce the pressure pulsation after valve closing while suppressing a decrease in the pressure of the fuel during the valve opening time.

Seventh Embodiment

Figure 18:
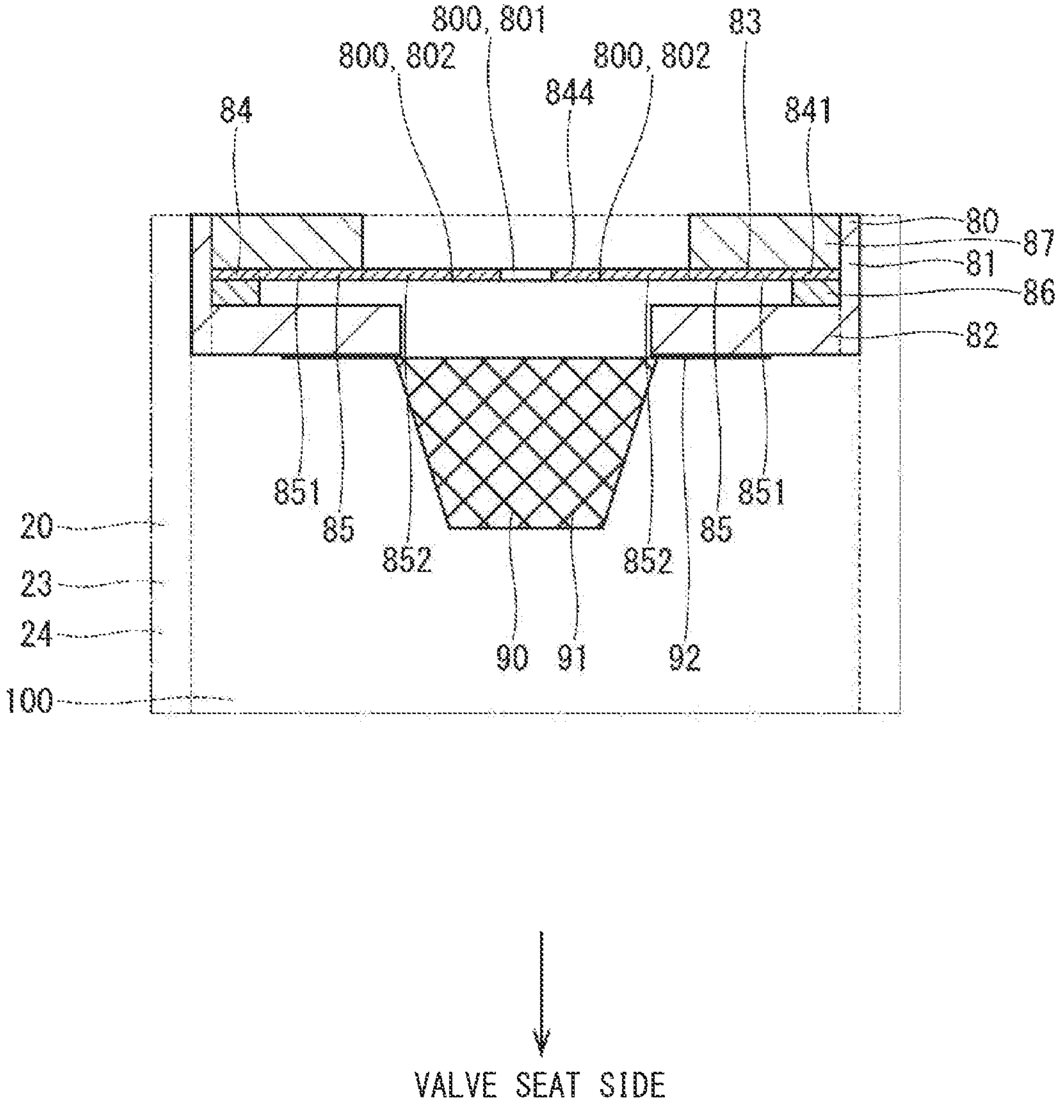
FIG. 18 is a cross-sectional view illustrating a throttle portion of the fuel injection valve according to a seventh embodiment.

FIG. 18 illustrates a part of a fuel injection valve according to a seventh embodiment. The seventh embodiment is different from the fourth embodiment in the configuration of the throttle portion 80, and the like.

In the present embodiment, the throttle portion 80 further includes a filter 90. The configuration of the filter 90 is substantially similar to that of the fifth embodiment, and thus the description thereof will be omitted.

The filter 90 is provided integrally with the restriction portion 82 so that an end surface of the flange portion 92 on the side opposite to the filter portion 91 is fixed to an end surface of the restriction portion 82 on a side opposite to the movable part 83. The filter 90 can collect foreign matter in the fuel passing through the filter portion 91.

The flow path area of the filter portion 91 is larger than the maximum value of the minimum flow path area of the throttle flow path 800 (throttle flow path 801 and throttle flow path 802).

Also in the seventh embodiment, as in the fourth embodiment, it is possible to reduce the pressure pulsation after valve closing while suppressing a decrease in the pressure of the fuel during the valve opening time.

Eighth Embodiment

Figure 19:
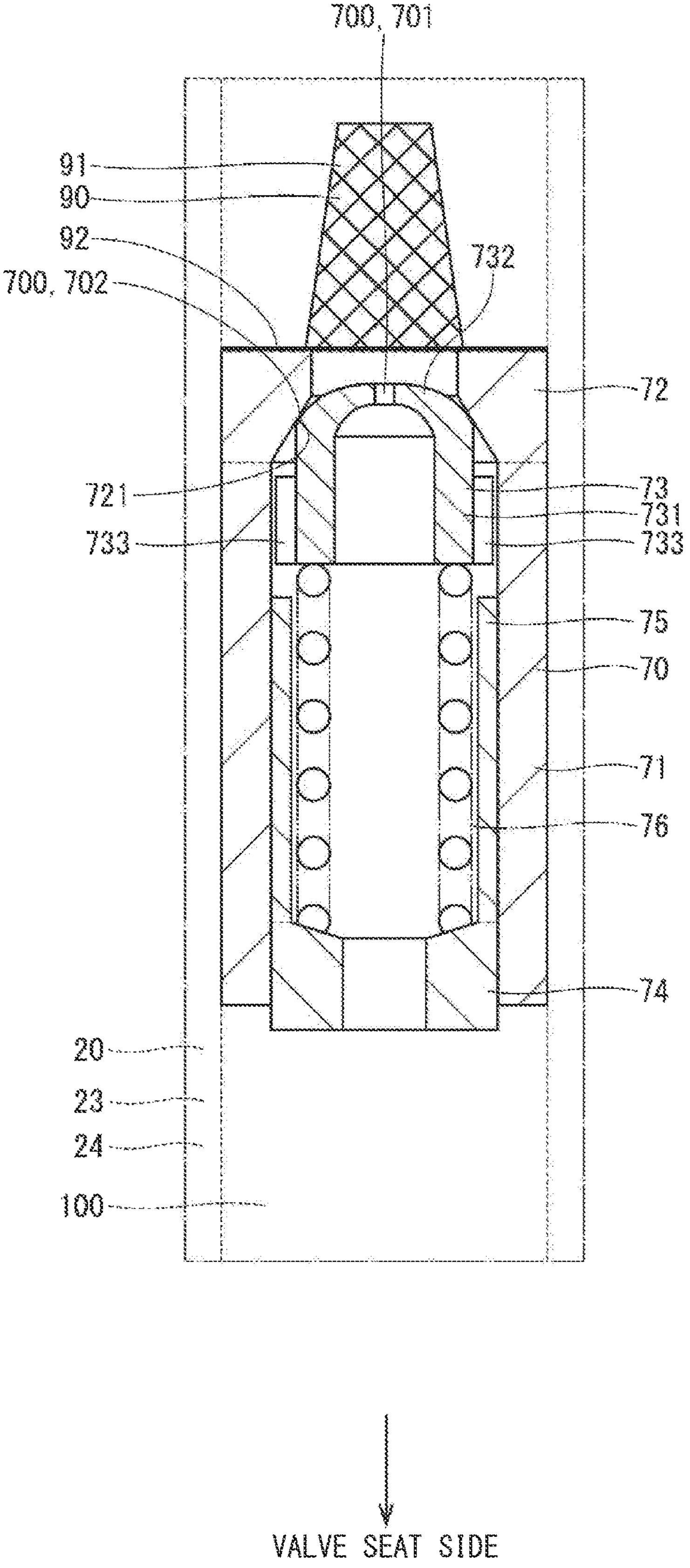
FIG. 19 is a cross-sectional view illustrating a throttle portion of the fuel injection valve according to an eighth embodiment.

FIG. 19 illustrates a part of a fuel injection valve according to an eighth embodiment. The eighth embodiment is different from the fifth embodiment in the configuration of the filter 90, and the like In the present embodiment, the filter 90 is provided integrally with the seat portion 72 so that the end surface of the flange portion 92 on the side opposite to the filter portion 91 is fixed to an end surface of the seat portion 72 on the side opposite to the throttle cylindrical portion 71.

The filter 90 is located inside the inlet portion 24.

Ninth Embodiment

Figure 20:
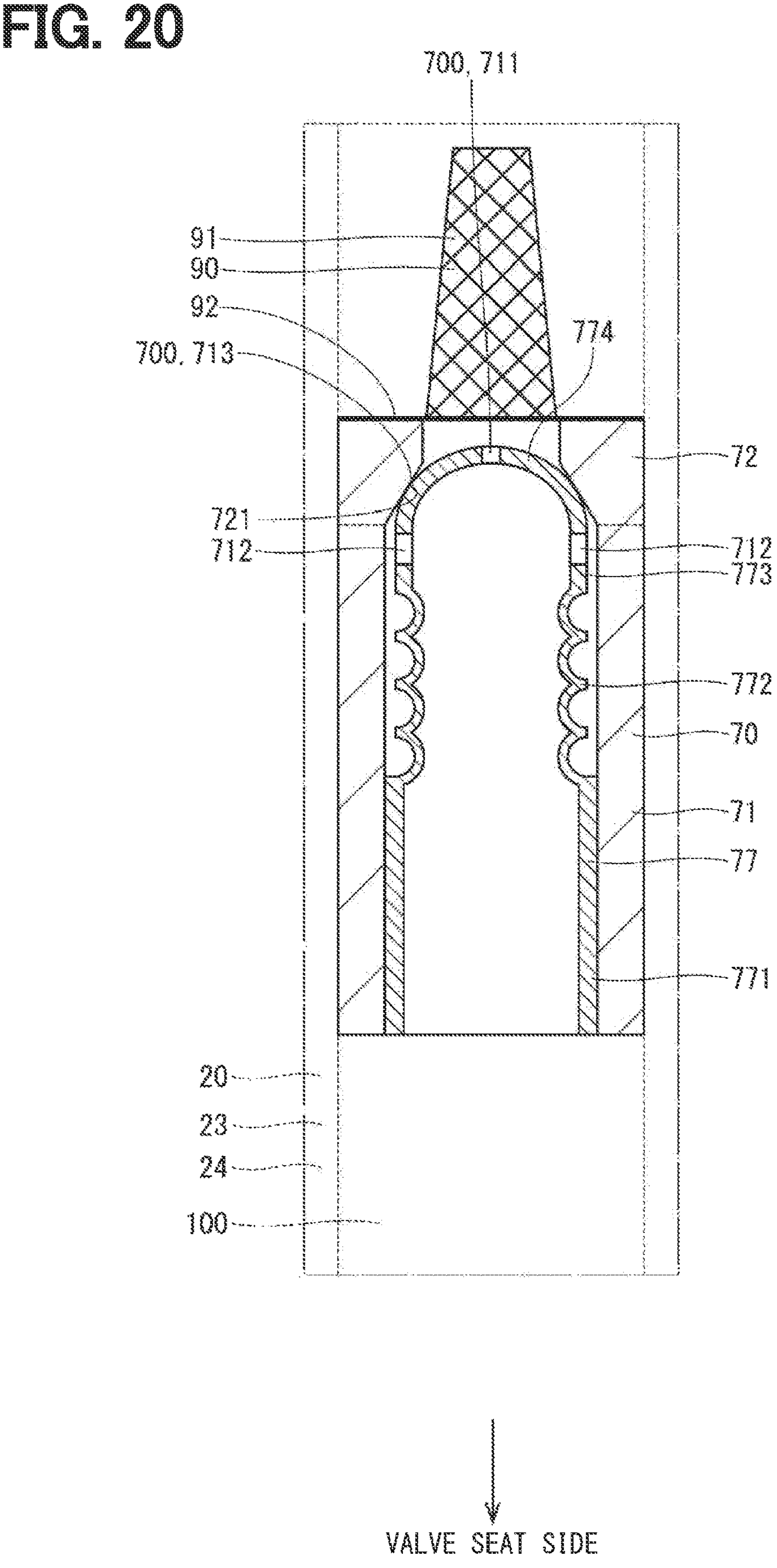
FIG. 20 is a cross-sectional view illustrating a throttle portion of the fuel injection valve according to a ninth embodiment.

FIG. 20 illustrates a part of a fuel injection valve according to a ninth embodiment. The ninth embodiment is different from the sixth embodiment in the configuration of the filter 90, and the like.

In the present embodiment, the filter 90 is provided integrally with the seat portion 72 so that the end surface of the flange portion 92 on the side opposite to the filter portion 91 is fixed to an end surface of the seat portion 72 on the side opposite to the throttle cylindrical portion 71.

The filter 90 is located inside the inlet portion 24.

Tenth Embodiment

Figure 21:
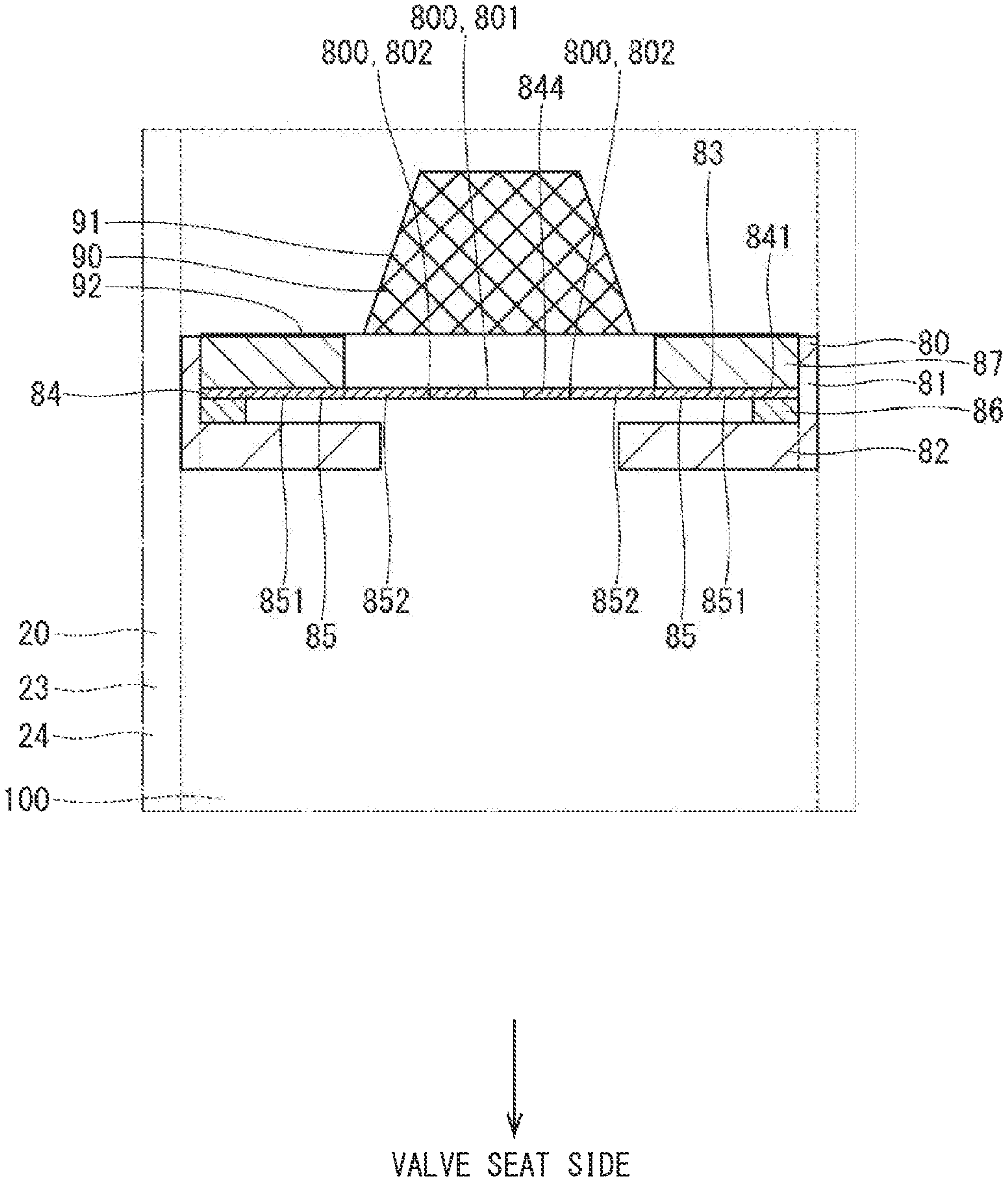
FIG. 21 is a cross-sectional view illustrating a throttle portion of the fuel injection valve according to a tenth embodiment.

FIG. 21 illustrates a part of a fuel injection valve according to a tenth embodiment. The tenth embodiment is different from the seventh embodiment in the configuration of the filter 90, and the like In the present embodiment, the filter 90 is provided integrally with the upper holding portion 87 so that the end surface of the flange portion 92 on the side opposite to the filter portion 91 is fixed to an end surface of the upper holding portion 87 on the side opposite to the movable part 83.

The filter 90 is located inside the inlet portion 24.

Eleventh Embodiment

Figure 22:
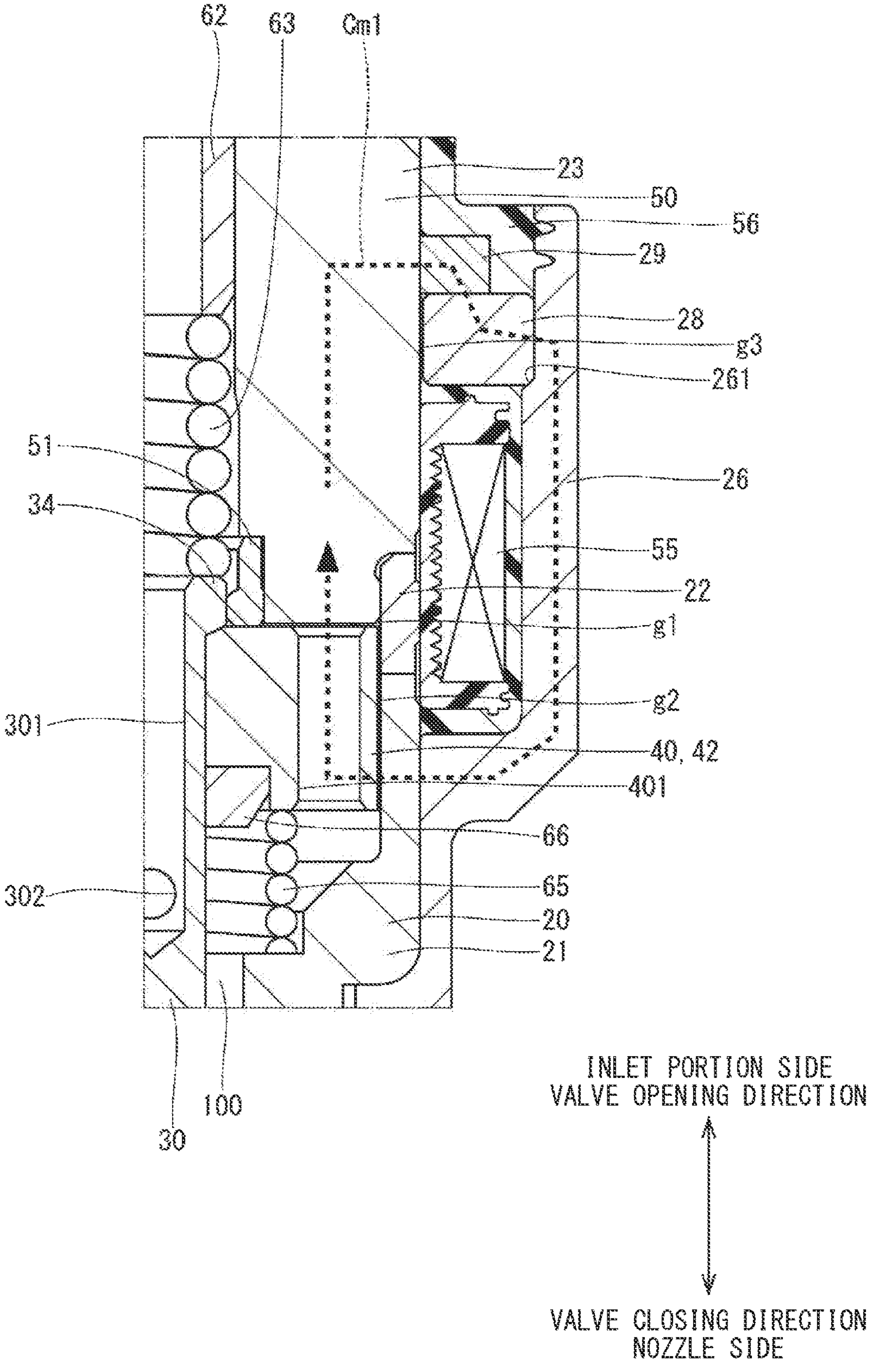
FIG. 22 is a cross-sectional view illustrating a part of the fuel injection valve according to an eleventh embodiment.

FIG. 22 illustrates a part of a fuel injection valve according to an eleventh embodiment. The eleventh embodiment is different from the first embodiment in the configuration of the movable core, and the like.

In the present embodiment, the movable core 40 does not include the inner core 41 illustrated in the first embodiment, but includes only the outer core 42. The outer core 42 is provided on the radially outer side of the needle 30 so as to be relatively movable in the axial direction with respect to the needle 30 on the nozzle 10 side with respect to the flange portion 34. An inner peripheral wall of the outer core 42 is slidable with the outer peripheral wall of the needle 30. Relative movement of the outer core 42 in the valve opening direction with respect to the needle 30 is restricted by the flange portion 34. The movable core 40 is formed with a communication hole 401 that communicates a surface of the outer core 42 on the nozzle 10 side with a surface on the fixed core portion 50 side.

In the present embodiment, the spring seat 64 illustrated in the first embodiment is not provided. The spring 65 is provided in a state where one end is abutted on the surface of the outer core 42 on the nozzle 10 side and the other end is abutted on with the inner wall of the first cylindrical member 21. The spring 65 can bias the outer core 42 toward the fixed core portion 50 side, that is, in the valve opening direction.

When the surface of the outer core 42 on the fixed core portion 50 side is abutted on the end surface of the sleeve 51 on the nozzle 10 side, a substantially annular gap g1 is formed between the surface of the outer core 42 on the fixed core portion 50 side and the end surface of the fixed core portion 50 on the nozzle 10 side (see FIG. 22).

The present embodiment does not include the gap forming member 61 illustrated in the first embodiment. An end portion of the spring 63 on a side opposite to the adjusting pipe 62 is abutted on the flange portion 34 of the needle 30. The spring 63 can bias the needle 30 and the movable core 40 toward the nozzle 10 side, that is, in the valve closing direction.

The biasing force of the spring 65 is smaller than the biasing force of the spring 63. Therefore, when the coil 55 is not energized, the needle 30 is pressed against the valve seat 14 by the spring 63, and the outer core 42 is pressed against the flange portion 34 by the spring 65.

In the present embodiment, the needle 30 is provided with a stopper 66. The stopper 66 is formed in an annular shape by, for example, a non-magnetic material. The stopper 66 is press-fitted so that an inner peripheral wall is fitted to the outer peripheral wall of the needle 30 on the nozzle 10 side with respect to the outer core 42. Here, the outer core 42 is relatively movable in the axial direction with respect to the needle 30 between the flange portion 34 and the stopper 66. The stopper 66 can restrict the movement of the outer core 42 in the valve closing direction with respect to the needle 30 by abutting on the surface of the outer core 42 on the nozzle 10 side.

The outer peripheral wall of the flange portion 34 is slidable with the inner peripheral wall of the end portion of the sleeve 51 on the nozzle 10 side. Therefore, reciprocating movement in the axial direction of the end portion of the needle 30 on the flange portion 34 side is guided by the sleeve 51.

Here, a substantially cylindrical gap g2 is formed between an outer peripheral wall of the outer core 42, the inner peripheral wall of the first cylindrical member 21, and the inner peripheral wall of the second cylindrical member 22.

In the present embodiment, the housing 20 includes an upper housing 28 and a magnetic material ring 29. The end portion of the third cylindrical member 23 on the nozzle 10 side, that is, an outer peripheral wall of the fixed core portion 50 is formed in a substantially cylindrical surface shape. A stepped surface 261 is formed on an inner peripheral wall of the holder 26. The stepped surface 261 is formed in a tapered shape so as to approach the axis of the holder 26 from the inlet portion 24 side toward the nozzle 10 side.

The upper housing 28 is formed in a substantially annular shape by, for example, a magnetic material. The upper housing 28 is press-fitted so that an outer peripheral wall is fitted to the inner peripheral wall of the holder 26 on the inlet portion 24 side with respect to the stepped surface 261. Here, movement of the upper housing 28 toward the nozzle 10 side is restricted by the outer edge portion of the surface on the nozzle 10 side abutting on the stepped surface 261.

An inner diameter of the upper housing 28 is larger than the outer diameter of the fixed core portion 50. Therefore, a substantially cylindrical gap g3 is formed between an inner peripheral wall of the upper housing 28 and the outer peripheral wall of the fixed core portion 50.

The magnetic material ring 29 is formed in a substantially annular shape by, for example, a magnetic material. The magnetic material ring 29 is press-fitted so that an inner peripheral wall is fitted to the outer peripheral wall of the fixed core portion 50 on the inlet portion 24 side with respect to the upper housing 28. Here, the magnetic material ring 29 is provided so that the surface on the nozzle 10 side is abutted on a surface on the inlet portion 24 side of the upper housing 28.

When the coil 55 is energized, a magnetic circuit is formed in the fixed core portion 50, the magnetic material ring 29, the upper housing 28, the holder 26, the first cylindrical member 21, and the outer core 42. Thus, a magnetic attraction force is generated between the fixed core portion 50 and the outer core 42, and the outer core 42 is attracted together with the needle 30 toward the fixed core portion 50 side, that is, in the valve opening direction.

A surface of the outer core 42 attracted in the valve opening direction on the fixed core portion 50 side is abutted on an end surface of the sleeve 51 on the nozzle 10 side. Thus, the movement of the outer core 42 in the valve opening direction is restricted. When the energization of the coil 55 is stopped, the needle 30 and the outer core 42 are biased in the valve closing direction by the biasing force of the spring 63. When the needle 30 is abutted on the valve seat 14 to close the valve, the outer core 42 moves relative to the needle 30 in the valve closing direction and is abutted on the stopper 66. Thus, the movement of the outer core 42 in the valve closing direction is restricted.

As described above, in the present embodiment, the outer peripheral wall of the fixed core portion 50 is formed in a substantially cylindrical surface shape. Therefore, the outer diameter of a base material of the fixed core portion 50 can be reduced as compared with the first embodiment in which an annular projecting portion is formed on a radially outer side of the fixed core portion 50.

Here, although the outer peripheral wall of the upper housing 28 is press-fitted into the holder 26, the inner peripheral wall is not press-fitted into the outer peripheral wall of the fixed core portion 50, and the gap g3 is formed between the upper housing 28 and the fixed core portion 50. Therefore, if the magnetic material ring 29 is not provided, magnetic flux may decrease due to the increase in the magnetic resistance by the gap g3, and the energy required for valve opening may increase.

Therefore, in the present embodiment, by providing the magnetic material ring 29 press-fitted into the outer peripheral wall of the fixed core portion 50 and abutting on the surface of the upper housing 28 on the inlet portion 24 side in the axial direction, it is possible to form a magnetic circuit Cm1 having a small passing gap (see FIG. 22). Thus, it is possible to suppress an increase in energy required for opening the valve while reducing the outer diameter of the base material of the fixed core portion 50.

The magnetic material ring 29 is pressed against the upper housing 28 by a molding pressure during injection molding of the mold portion 56. Thus, the upper housing 28 and the magnetic material ring 29 can be brought into close contact with each other. During injection molding of the mold portion 56, melted resin flows from the magnetic material ring 29 side to the coil 55 side via a notch portion (not illustrated) formed in the upper housing 28. In the gap g3, resin forming the mold portion 56 may exist.

Other Embodiments

In the above-described embodiment, an example has been illustrated in which the maximum value of the distance by which the movable part is relatively movable with respect to the housing is smaller than the maximum value of the movable distance of the needle from the valve seat. On the other hand, in another embodiment, the maximum value of the distance by which the movable part is relatively movable with respect to the housing may be equal to or more than the maximum value of the movable distance of the needle from the valve seat.

In the above-described embodiment, an example has been illustrated in which the minimum flow path area of the throttle flow path during the valve closing time is smaller than the minimum flow path area between the valve seat and the needle during the valve opening time in which the needle is most separated from the valve seat. On the other hand, in another embodiment, the minimum flow path area of the throttle flow path during the valve closing time may be equal to or larger than the minimum flow path area between the valve seat and the needle during the valve opening time in which the needle is most separated from the valve seat.

In another embodiment, the throttle portion is not limited to the inside of the fuel injection valve, and may be provided in, for example, the pipe that supplies the fuel to the fuel injection valve, or the like.

In the first embodiment, an example has been illustrated in which the spring force of the spring 76 is set to be smaller than 7 N. On the other hand, in another embodiment, the spring force of the spring 76 may be set to 7 N or more.

In the first embodiment, an example has been illustrated in which the seat portion 72 and the throttle cylindrical portion 71 are formed by a material having higher hardness than the spring seat portion 74 and the restriction portion 75. On the other hand, in another embodiment, the seat portion 72 and the throttle cylindrical portion 71 may be formed by a material having lower hardness than the spring seat portion 74 and the restriction portion 75.

In the first embodiment, an example has been illustrated in which the surface roughness of the outer wall of the movable bottom portion 732 of the movable part 73 is smaller than the surface roughness of the seat 721. On the other hand, in another embodiment, the surface roughness of the outer wall of the movable bottom portion 732 of the movable part 73 may be equal to or higher than the surface roughness of the seat 721.

In the first embodiment, an example has been illustrated in which the outer wall of the movable bottom portion 732 of the movable part 73 is formed in the SR shape. On the other hand, in another embodiment, the outer wall of the movable bottom portion 732 of the movable part 73 may be formed in a shape other than the SR shape, for example, a tapered shape or the like.

As described above, the present disclosure is not limited to the above embodiment, and can be implemented in various forms without departing from the gist of the present disclosure.

The present disclosure has been described based on the embodiments. However, the present disclosure is not limited to the embodiments and structures. The present disclosure also encompasses various modifications and variations within the scope of equivalents. Various combinations and modes, and other combinations and modes including only one element, more elements, or less elements therein are also within the scope and spirit of the present disclosure.

What is claimed is:

1. A fuel injection valve comprising:

a nozzle that includes an injection hole through which fuel is injected and a valve seat formed around the injection hole;

a housing that has a fuel flow path through which the fuel to the injection hole flows;

a needle one end of which is configured to open and close the injection hole by being separated from the valve seat or abutted on the valve seat; and a throttle portion that is provided upstream with respect to the valve seat in a fuel flow direction, and includes a movable part at least a part of which is relatively movable with respect to the housing, and a throttle flow path that is formed so as to allow the fuel to flow through and has a minimum flow path area that changes when the movable part moves relative to the housing, wherein the minimum flow path area of the throttle flow path during a valve opening time in which the needle is separated from the valve seat is larger than the minimum flow path area of the throttle flow path during a valve closing time in which the needle is abutted on the valve seat, the minimum flow path area of the throttle flow path during the valve opening time is larger than a minimum flow path area between the valve seat and the needle during the valve opening time in which the needle is most separated from the valve seat, a maximum value of the minimum flow path area of the throttle flow path during the valve opening time is regulated to be constant, and the needle is provided separately from the throttle portion so as to be relatively movable with respect to the throttle portion, and is provided between the valve seat and the throttle portion.

2. The fuel injection valve according to claim 1, wherein the minimum flow path area of the throttle flow path increases or decreases when at least the part of the movable part moves with respect to the housing due to a differential pressure by the needle opening and closing the injection hole.

3. The fuel injection valve according to claim 1, wherein a maximum value of a distance for which the movable part moves with respect to the housing is smaller than a maximum value of a movable distance for which the needle moves with respect to the valve seat.

4. The fuel injection valve according to claim 1, wherein the minimum flow path area of the throttle flow path during the valve closing time is smaller than the minimum flow path area between the valve seat and the needle during the valve opening time in which the needle is most separated from the valve seat.

* * * * *